United States Patent
Silva et al.

(10) Patent No.: US 10,678,675 B2
(45) Date of Patent: Jun. 9, 2020

(54) ASSISTIVE, LANGUAGE-AGNOSTIC DEBUGGING WITH MULTI-COLLABORATOR CONTROL

(71) Applicant: Microsoft Technology Licensing, LLC, Redmond, WA (US)

(72) Inventors: Rodrigo Andres Varas Silva, Sammamish, WA (US); Kesavan Shanmugam, Redmond, WA (US); Charles Eric Lantz, Burnsville, MN (US); Jonathan Preston Carter, Seattle, WA (US); Simon Calvert, Sammamish, WA (US); Erich Gamma, Gutenswil (CH); Andre Weinand, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/879,266

(22) Filed: Jan. 24, 2018

(65) Prior Publication Data
US 2019/0146898 A1 May 16, 2019

Related U.S. Application Data

(60) Provisional application No. 62/585,988, filed on Nov. 14, 2017.

(51) Int. Cl.
G06F 11/36 (2006.01)
H04L 29/06 (2006.01)
(Continued)

(52) U.S. Cl.
CPC ............ *G06F 11/3664* (2013.01); *G06F 8/30* (2013.01); *G06F 8/33* (2013.01); *G06F 8/41* (2013.01);
(Continued)

(58) Field of Classification Search
CPC .... G06F 11/36; G06F 11/362; G06F 11/3624; G06F 11/3632; G06F 11/3636;
(Continued)

(56) References Cited

U.S. PATENT DOCUMENTS

| 5,361,360 A | 11/1994 | Ishigami et al. |
| 5,535,375 A | 7/1996 | Eshel et al. |

(Continued)

OTHER PUBLICATIONS

"Software build," Wikipedia, last retrived from https://en.wikipedia.org/wiki/Software_build on Oct. 29, 2018. (Year: 2018).*

(Continued)

*Primary Examiner* — Andrew M. Lyons
(74) *Attorney, Agent, or Firm* — Workman Nydegger

(57) ABSTRACT

A collaboration session is provided in which an owner computer system and a participant computer system are both members. Within this collaboration session, both the owner and the participant computer systems are provided access to a multi-file workspace's build instance. Here, the multi-file workspace and the build instance are both stored locally on the owner computer system. Further, this workspace includes multiple files of source code. As a result, the build instance is a build of that source code. Various debug commands that are directed to the build instance may be received. Some of these commands originate from the owner computer system while others originate from the participant computer system. These debug commands are then multiplexed, and the build instance is executed in accordance with the multiplexed debug commands. As a result of executing the build instance, debugging data is generated.

20 Claims, 13 Drawing Sheets

US 10,678,675 B2

Page 2

(51) Int. Cl.

| | | |
|---|---|---|
| *G06F 16/176* | (2019.01) | |
| *G06F 9/52* | (2006.01) | |
| *G06F 17/22* | (2006.01) | |
| *G06F 9/54* | (2006.01) | |
| *H04L 12/18* | (2006.01) | |
| *G06Q 10/10* | (2012.01) | |
| *H04L 29/08* | (2006.01) | |
| *G06F 8/71* | (2018.01) | |
| *G06F 21/62* | (2013.01) | |
| *G06F 8/33* | (2018.01) | |
| *G06F 8/41* | (2018.01) | |
| *G06F 16/18* | (2019.01) | |
| *G06F 16/13* | (2019.01) | |
| *G06F 16/17* | (2019.01) | |
| *G06F 17/24* | (2006.01) | |
| *G06F 8/30* | (2018.01) | |
| *G06F 3/0482* | (2013.01) | |
| *G06F 3/0484* | (2013.01) | |

(52) U.S. Cl.
CPC .................. *G06F 8/71* (2013.01); *G06F 9/52* (2013.01); *G06F 9/542* (2013.01); *G06F 9/543* (2013.01); *G06F 11/362* (2013.01); *G06F 11/3632* (2013.01); *G06F 11/3636* (2013.01); *G06F 11/3668* (2013.01); *G06F 16/13* (2019.01); *G06F 16/176* (2019.01); *G06F 16/1734* (2019.01); *G06F 16/1873* (2019.01); *G06F 17/2288* (2013.01); *G06F 17/24* (2013.01); *G06F 21/6218* (2013.01); *G06Q 10/101* (2013.01); *H04L 12/1813* (2013.01); *H04L 12/1822* (2013.01); *H04L 63/08* (2013.01); *H04L 65/1069* (2013.01); *H04L 65/403* (2013.01); *H04L 67/02* (2013.01); *H04L 67/14* (2013.01); *G06F 3/0482* (2013.01); *G06F 3/0484* (2013.01); *H04L 67/141* (2013.01)

(58) Field of Classification Search
CPC ........... G06F 11/3664; G06F 17/30165; G06F 3/0482; G06F 3/0484; G06F 8/30; G06F 8/33; G06F 8/41; G06F 8/71; G06F 9/52; G06F 9/542; G06F 9/543; G06F 16/13; G06F 16/1734; G06F 16/176; G06F 16/1873; G06F 17/2288; G06F 17/24; G06F 21/6218; H04L 65/1069; H04L 65/403; H04L 12/1813; H04L 12/1822; H04L 63/08; H04L 67/02; H04L 67/14; H04L 67/141; G06Q 10/101
USPC .................................................. 717/124–135
See application file for complete search history.

(56) References Cited

U.S. PATENT DOCUMENTS

| | | | |
|---|---|---|---|
| 6,405,364 B1 | 6/2002 | Bowman-Amuah | |
| 7,249,314 B2 | 7/2007 | Walker et al. | |
| 7,359,990 B2 | 4/2008 | Munir et al. | |
| 7,734,685 B2 | 6/2010 | Cheng et al. | |
| 7,774,703 B2* | 8/2010 | Junuzovic | G06Q 10/10 715/229 |
| 7,805,702 B2* | 9/2010 | Jacovi | G06F 9/453 717/103 |
| 8,032,470 B1 | 10/2011 | Heidenreich et al. | |
| 8,196,029 B1 | 6/2012 | Rucker et al. | |
| 8,230,348 B2 | 7/2012 | Peters et al. | |
| 8,234,620 B1 | 7/2012 | Bychkov et al. | |
| 8,321,483 B2 | 11/2012 | Serlet et al. | |
| 8,434,002 B1 | 4/2013 | Shah et al. | |
| 8,789,014 B2* | 7/2014 | Robison | G06F 8/30 717/120 |
| 8,819,617 B1 | 8/2014 | Koenig et al. | |
| 9,026,652 B1 | 5/2015 | Piehler et al. | |
| 9,244,817 B2* | 1/2016 | Cai | G06F 11/362 |
| 9,268,670 B1* | 2/2016 | Lachwani | G06F 11/3684 |
| 9,465,784 B1 | 10/2016 | Hagopian et al. | |
| 9,483,259 B1 | 11/2016 | Lee et al. | |
| 9,729,615 B2 | 8/2017 | Nair | |
| 10,049,028 B2 | 8/2018 | Tucker et al. | |
| 10,055,205 B2 | 8/2018 | Di Balsamo et al. | |
| 10,261,885 B2 | 4/2019 | Tucker et al. | |
| 2002/0056003 A1 | 5/2002 | Goswami | |
| 2002/0129106 A1* | 9/2002 | Gutfreund | G06Q 10/10 709/205 |
| 2004/0003119 A1* | 1/2004 | Munir | G06F 8/33 709/246 |
| 2004/0234315 A1 | 11/2004 | Colwell et al. | |
| 2004/0261064 A1* | 12/2004 | Goldstein | G06F 8/48 717/140 |
| 2005/0172168 A1* | 8/2005 | Kilian | G06F 11/362 714/31 |
| 2006/0195894 A1* | 8/2006 | Nita | G06F 11/3664 726/11 |
| 2007/0220479 A1 | 9/2007 | Hughes | |
| 2008/0005235 A1* | 1/2008 | Hegde | G06Q 10/10 709/204 |
| 2008/0028323 A1 | 1/2008 | Rosen et al. | |
| 2008/0059941 A1 | 3/2008 | Payne et al. | |
| 2008/0120564 A1* | 5/2008 | Balasubramanian | G06F 11/362 715/771 |
| 2009/0021855 A1 | 1/2009 | Fasen | |
| 2009/0125518 A1 | 5/2009 | Bailor et al. | |
| 2009/0133033 A1* | 5/2009 | Lindo | G06F 11/0778 718/108 |
| 2009/0245843 A1* | 10/2009 | Sato | G03G 15/2039 399/69 |
| 2009/0249224 A1 | 10/2009 | Davis et al. | |
| 2009/0271708 A1 | 10/2009 | Peters et al. | |
| 2010/0057865 A1* | 3/2010 | Chan | G06F 11/3664 709/206 |
| 2010/0174783 A1* | 7/2010 | Zarom | G06F 9/526 709/205 |
| 2010/0191785 A1 | 7/2010 | Serlet et al. | |
| 2010/0257457 A1 | 10/2010 | De Goes | |
| 2011/0296300 A1 | 12/2011 | Parker | |
| 2012/0023418 A1* | 1/2012 | Frields | G06Q 10/101 715/756 |
| 2012/0047295 A1* | 2/2012 | Wong | G06F 13/102 710/50 |
| 2012/0084758 A1* | 4/2012 | Bates | G06F 11/362 717/125 |
| 2012/0102459 A1* | 4/2012 | Bates | G06F 11/362 717/124 |
| 2012/0102460 A1* | 4/2012 | Bates | G06F 11/362 717/124 |
| 2012/0102463 A1* | 4/2012 | Bates | G06F 11/362 717/125 |
| 2012/0102464 A1* | 4/2012 | Bates | G06F 9/44 717/125 |
| 2012/0102465 A1* | 4/2012 | Bates | G06F 11/362 717/125 |
| 2012/0102466 A1* | 4/2012 | Bates | G06F 11/3624 717/125 |
| 2012/0102467 A1* | 4/2012 | Bates | G06F 11/362 717/125 |
| 2012/0117457 A1 | 5/2012 | Yuniardi | |
| 2012/0117541 A1* | 5/2012 | Bates | G06F 11/362 717/125 |
| 2012/0117542 A1* | 5/2012 | Bates | G06F 11/3636 717/125 |
| 2012/0117543 A1* | 5/2012 | Bates | G06F 11/323 717/125 |
| 2012/0137268 A1 | 5/2012 | Dattke | |
| 2012/0151446 A1* | 6/2012 | Sathya | G06F 11/3656 717/125 |

(56) References Cited

U.S. PATENT DOCUMENTS

| | | | |
|---|---|---|---|
| 2012/0246610 A1* | 9/2012 | Asadullah | G06F 8/33 717/103 |
| 2012/0254773 A1 | 10/2012 | Viswanathan | |
| 2012/0272216 A1* | 10/2012 | Bates | G06F 11/362 717/125 |
| 2012/0272217 A1* | 10/2012 | Bates | G06F 11/362 717/125 |
| 2012/0272218 A1* | 10/2012 | Bates | G06F 11/362 717/125 |
| 2012/0272219 A1* | 10/2012 | Bates | G06F 11/362 717/125 |
| 2012/0278388 A1* | 11/2012 | Kleinbart | G06Q 10/06 709/204 |
| 2012/0278790 A1* | 11/2012 | Bates | G06F 11/3636 717/125 |
| 2012/0297363 A1 | 11/2012 | Perisic et al. | |
| 2012/0317552 A1* | 12/2012 | Bates | G06F 11/3636 717/129 |
| 2012/0331351 A1 | 12/2012 | Davis et al. | |
| 2012/0331404 A1 | 12/2012 | Buford et al. | |
| 2013/0007716 A1* | 1/2013 | Bates | G06F 11/362 717/125 |
| 2013/0185252 A1 | 7/2013 | Palmucci | |
| 2013/0205203 A1 | 8/2013 | Macdougall et al. | |
| 2013/0247004 A1* | 9/2013 | DeLuca | G06F 15/16 717/120 |
| 2013/0262373 A1 | 10/2013 | Rampson | |
| 2013/0275312 A1* | 10/2013 | Claman | G06Q 10/103 705/301 |
| 2013/0275948 A1* | 10/2013 | Bates | G06F 11/3624 717/124 |
| 2014/0047356 A1* | 2/2014 | Ameller-Van-Baumberghen | H04L 67/10 715/753 |
| 2014/0173565 A1* | 6/2014 | Scholl | G06F 11/3664 717/124 |
| 2014/0289645 A1 | 9/2014 | Megiddo et al. | |
| 2015/0033078 A1* | 1/2015 | Wintergerst | G06F 11/362 714/38.1 |
| 2015/0040101 A1 | 2/2015 | Rummler et al. | |
| 2015/0106790 A1* | 4/2015 | Bigwood | G06F 11/3624 717/127 |
| 2015/0135165 A1* | 5/2015 | Simernitski | G06F 11/3664 717/124 |
| 2015/0142949 A1 | 5/2015 | Nair | |
| 2015/0149404 A1* | 5/2015 | Lock | H04L 65/403 707/608 |
| 2015/0193406 A1 | 7/2015 | Lemonik et al. | |
| 2016/0004529 A1* | 1/2016 | Xia | G06F 8/654 717/178 |
| 2016/0092211 A1 | 3/2016 | Atanasiu et al. | |
| 2016/0103662 A1 | 4/2016 | Di balsamo et al. | |
| 2016/0112262 A1 | 4/2016 | Johnson et al. | |
| 2016/0224337 A1 | 8/2016 | Xia et al. | |
| 2016/0321291 A1 | 11/2016 | Malhotra et al. | |
| 2017/0003835 A1* | 1/2017 | Shaffer | G06F 3/0482 |
| 2017/0017779 A1 | 1/2017 | Huang et al. | |
| 2017/0083490 A1* | 3/2017 | Kikin-Gil | G06F 17/24 |
| 2017/0097822 A1* | 4/2017 | DeLuca | G06F 8/71 |
| 2017/0168809 A1 | 6/2017 | Zander | |
| 2017/0262294 A1 | 9/2017 | Yakan | |
| 2017/0269926 A1* | 9/2017 | Xu | H04L 41/082 |
| 2017/0353458 A1* | 12/2017 | Lipke | G06F 11/362 |
| 2017/0357486 A1* | 12/2017 | DeLuca | G06F 8/30 |
| 2018/0004628 A1* | 1/2018 | Strong | G06F 9/3004 |
| 2018/0121327 A1* | 5/2018 | Grebenschikov | G06F 11/3664 |
| 2018/0124155 A1 | 5/2018 | Ryzhkov et al. | |
| 2018/0129584 A1* | 5/2018 | Somasundaram | G06N 20/00 |
| 2018/0157676 A1 | 6/2018 | Milvaney et al. | |
| 2018/0181552 A1 | 6/2018 | Konnola et al. | |
| 2019/0079909 A1 | 3/2019 | Purandare et al. | |
| 2019/0129973 A1 | 5/2019 | Truong et al. | |
| 2019/0146758 A1 | 5/2019 | Lantz et al. | |
| 2019/0146783 A1 | 5/2019 | Ginchereau et al. | |
| 2019/0146899 A1 | 5/2019 | Lantz et al. | |
| 2019/0147048 A1 | 5/2019 | Pugh et al. | |
| 2019/0149346 A1 | 5/2019 | Shanmugam et al. | |
| 2019/0278839 A1* | 9/2019 | Codrington | G06F 16/2282 |

OTHER PUBLICATIONS

Gousset, Mickey, "Visual Studio Collaboration, Anywhere," Visual Studio Magazine, Jun. 3, 2013, last retrieved from https://visualstudiomagazine.com/articles/2013/06/03/visual-studio-collaboration-anywhere.aspx on Apr. 28, 2019. (Year: 2013).*

Heydarian, Habib, "One bug, two developers: Collaborative debugging is now a reality in Visual Studio 2010," Microsft Developer, last retrieved from https://blogs.msdn.rnicrosoft.corn/habibh/2009/12/01/one-bug-two-developers-collaborative-debugging-is-now-a-reality-in-visual-studio-2010/ on Apr. 28, 2019. (Year: 2009).*

H. C. Estler, M. Nordio, C. A. Furia and B. Meyer, "Collaborative Debugging," 2013 IEEE 8th International Conference on Global Software Engineering, Bari, 2013, pp. 110-119. (Year: 2013).*

Nezha, R., et al., Extending CloudStudio with collaborative remote debugger, Master of Science Thesis, 2012, 139 pages, last retrieved from https://www.politesi.polimi.it/handle/10589/72462 on Nov. 11, 2019. (Year: 2012).*

Chien-Ming Wang, Shyh-Fong Hong, Shun-Te Wang and Hsi-Min Chen, "A dual-mode exerciser for a collaborative computing environment," 11th Asia-Pacific Software Engineering Conference, Busan, South Korea, 2004, pp. 240-248. (Year: 2004).*

J. J Zhang et al., "CDebugger: A scalable parallel debugger with dynamic communication topology configuration," 2011 International Conference on Cloud and Service Computing, Hong Kong, 2011, pp. 228-234. (Year: 2011).*

"JSON-RPC 2.0 Specification", Retrieved From: <<http://www.jsonrpc.org/specification>>, Mar. 26, 2010, 7 Pages.

"Non Final Office Action Issued in U.S. Appl. No. 15/879,256", dated Sep. 20, 2018, 17 Pages.

"Non Final Office Action Issued in U.S. Appl. No. 15/879,261", dated Oct. 5, 2018, 26 Pages.

"Non Final Office Action Issued in U.S. Appl. No. 15/879,296", dated Nov. 2, 2018, 20 Pages.

"The Vs Code Team: Common Language Server Protocol", Retrieved From: https://code.visualstudio.com/blogs/2016/06/27/common-language-protocol, Jun. 27, 2016, 4 Pages.

Barbero, Mikael, "The Language Server Protocol: Why the Hype?", Retrieved From: https://www.slideshare.net/mikaelbarbero/language-server-protocol-why-the-hype, Jul. 29, 2017, 72 Pages.

Estler, et al., "Collaborative Debugging", In Proceedings of the IEEE 8th International Conference on Global Software Engineering, Aug. 26, 2013, pp. 110-119.

Goldman, et al., "Real-Time Collaborative Coding in a Web IDE", In Proceedings of the 24th Annual ACM Symposium on User Interface Software and Technology, Oct. 16-19, 2011, pp. 155-164.

Keidel, Sven, "A Disintegrated Development Environment", Retrieved From: http://www.informatik.uni-marburg.de/~seba/teaching/thesis-keidel.pdf, Apr. 9, 2015, 47 Pages.

"International Search Report and Written Opinion Issued in PCT Application No. PCT/US18/059714", dated Feb. 21, 2019, 11 Pages.

"International Search Report and Written Opinion Issued in PCT Application No. PCT/US18/059715", dated Feb. 21, 2019, 13 Pages.

"International Search Report and Written Opinion Issued in PCT Application No. PCT/US18/059716", dated Feb. 21, 2019, 12 Pages.

"International Search Report and Written Opinion Issued in PCT Application No. PCT/US18/059717", dated Feb. 19, 2019, 13 Pages.

"International Search Report and Written Opinion Issued in PCT Application No. PCT/US18/059718", dated Feb. 18, 2019, 12 Pages.

(56) References Cited

OTHER PUBLICATIONS

"International Search Report and Written Opinion Issued in PCT Application No. PCT/US18/059719", dated Feb. 19, 2019, 15 Pages.
"Final Office Action Issued in U.S. Appl. No. 15/879,261", dated Jun. 20, 2019, 22 Pages.
"Final Office Action Issued in U.S. Appl. No. 15/879,256", dated May 3, 2019, 17 Pages.
"Final Office Action Issued in U.S. Appl. No. 15/879,296", dated May 16, 2019, 20 Pages.
"Non Final Office Action Issued in U.S. Appl. No. 15/879,256", dated Aug. 14, 2019, 20 Pages.
"Non Final Office Action Issued in U.S. Appl. No. 15/879,296", dated Aug. 22, 2019, 21 Pages.
"Non Final Office Action Issued in U.S. Appl. No. 15/879,261", dated Oct. 28, 2019, 24 Pages.
"Final Office Action Issued in U.S. Appl. No. 15/879,256", dated Feb. 4, 2020, 18 Pages.
"Non Final Office Action Issued in U.S. Appl. No. 15/879,289", dated Jan. 10, 2020, 12 Pages.
"Final Office Action Issued in U.S. Appl. No. 15/879,296", dated Feb. 21, 2020, 22 Pages.
"Final Office Action Issued in U.S. Appl. No. 15/879,261", dated Feb. 25, 2020, 25 Pages.
"Non-Final Office Action Issued in U.S. Appl. No. 15/948,714", dated Apr. 3, 2020, 15 Pages.

\* cited by examiner

ASSISTIVE, LANGUAGE-AGNOSTIC DEBUGGING WITH MULTI-COLLABORATOR CONTROL

CROSS-REFERENCE TO RELATED APPLICATIONS

This application claims priority to U.S. Provisional Application Ser. No. 62/585,988, filed on Nov. 14, 2017 and entitled "MULTI-FILE REAL-TIME COLLABORATION ENVIRONMENT," the entirety of which is incorporated herein by reference.

BACKGROUND

Computers and computing systems have impacted nearly every aspect of modern-day living. For instance, computers are generally involved in work, recreation, healthcare, transportation, and so forth.

A computer operates by executing a set of executable instructions (i.e. code). These instructions were created in a development environment by a developer in order to create an application. In many instances, the developer will generate many different versions of the code in an effort to improve the computer's operations and to remove any bugs that are present in the code. Once the instructions are compiled, interpreted, and/or built, an underlying computer system executes the instructions to provide the application's functionalities.

Different tools have been created to assist a developer in writing, editing, testing, and debugging an application's executable instructions. Some of these tools include program code text editors, source code editors, debuggers, and integrated development environments (IDEs), just to name a few. The process of generating and debugging code can be improved through the participation of additional developers. For example, by working together in a team, team members are able to jointly collaborate to review and improve a project.

The subject matter claimed herein is not limited to embodiments that solve any disadvantages or that operate only in environments such as those described above. Rather, this background is provided to illustrate only one example technology area where some embodiments described herein may be practiced.

BRIEF SUMMARY

At least some of the embodiments described herein relate to establishing a debugging session so that multiple collaborators are able to jointly edit source code. In some instances, the source code may be a part of a multi-file workspace that is shared to multiple collaborators during the debugging session. For example, a debugging session in which an owner computer system and a participant computer system are both members is established. Within this debugging session, both the owner computer system and the participant computer system are provided access to a multi-file workspace's build instance. Here, the multi-file workspace and the build instance are both stored locally on the owner computer system. Further, this workspace includes multiple files of source code. As a result, the build instance is a build of that source code.

The embodiments are also able to receive various debug commands that are directed to the build instance. Of note, some of the debug commands originate from the owner computer system while others originate from the participant computer system. The embodiments are also able to multiplex the debug commands and then execute the build instance in accordance with those debug commands. As a result of executing the build instance, the embodiments are able to generate debugging data. In this manner, the embodiments provide many advantages because they significantly improve how a workspace can be debugged.

This Summary is not intended to identify key or essential features of the claimed subject matter nor is it intended to be used as an aid in determining the scope of the claimed subject matter. Instead, this Summary is provided to introduce a selection of concepts in a simplified form. These concepts are more fully described below in the Detailed Description.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered limiting, the embodiments will be described and explained with additional specificity and detail through the use of the accompanying drawings in which.

DETAILED DESCRIPTION

Figure 1:
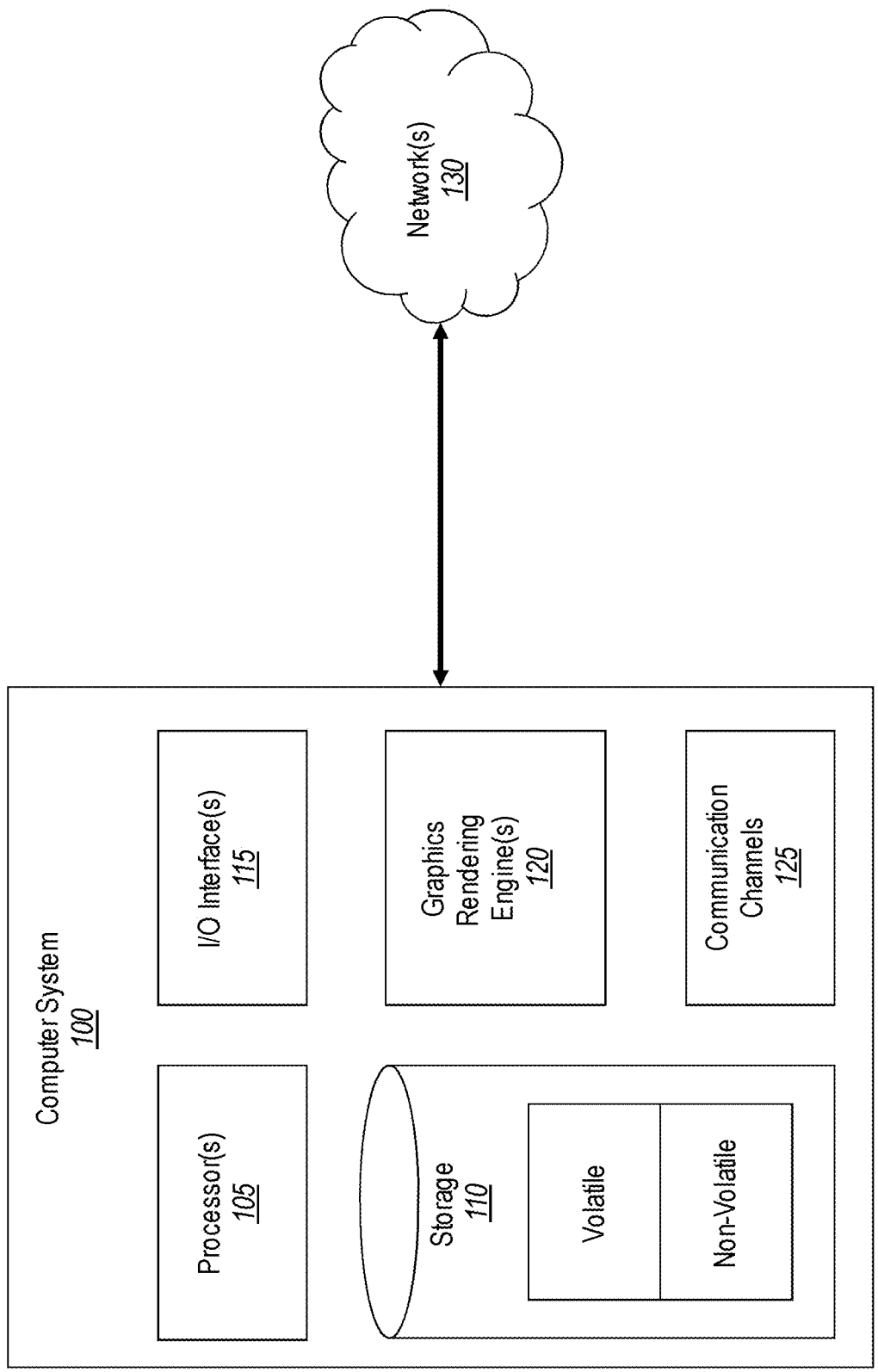
FIG. 1 illustrates an overall view of a computer system.

At least some of the embodiments described herein relate to establishing a debugging session so that multiple collaborators are able to jointly edit source code. In some instances, the source code may be a part of a multi-file workspace that is shared to multiple collaborators during the debugging session. For example, a debugging session in which an owner computer system and a participant computer system are both members is established. Within this debugging session, both the owner computer system and the participant computer system are provided access to a multi-file workspace's build instance. Here, the multi-file workspace and the build instance are both stored locally on the owner computer system. Further, this workspace includes multiple files of source code. As a result, the build instance is a build of that source code.

The embodiments are also able to receive various debug commands that are directed to the build instance. Of note, some of the debug commands originate from the owner computer system while others originate from the participant computer system. The embodiments are also able to multiplex the debug commands and then execute the build instance in accordance with those debug commands. As a result of executing the build instance, the embodiments are able to generate debugging data.

An advantage of the disclosed embodiments is that they allow an "owner collaborator" (or simply "owner") to remain in control of his/her multi-file workspace even when outside collaborators (also called hereinafter "participant collaborators" or simply "participant(s)") are joined with the owner in a "collaborative session." Here, the term "owner" can refer to either a "human owner" or an "owner computer system." Similarly, the term "participant" can refer to either a "human participant" or a "participant computer system." In contrast, an "owner computer system" and a "participant computer system" refer only to a computer system and do not include a human operator. Additionally, "collaborator" refers to any entity (e.g., an owner or a participant) that has joined a collaboration session while "collaborators" refers to some or all of the entities in the collaboration session (e.g., the owner and all of the participants).

As also used herein, a "multi-file workspace" is an assembly of multiple files that operate collectively by interacting with each other. As an example, a code development project may include multiple files of source code that, when executed, operate together to perform complex functions. Thus, a code development project may be considered a multi-file workspace. Other examples of a multi-file workspace include, but are not limited to, text files and/or word processing files (e.g., where the files are linked via a table of contents or some other linking unit), or any other content in which multiple sources of data are joined together. Yet another non-limiting example of a multi-file workspace is a wiki-based workspace that is configured to receive edits and/or markdowns from multiple entities. Accordingly, from this disclosure, it will be appreciated that the embodiments are able to operate with regard to any kind of multi-file workspace. For the sake of brevity, and by way of example only, the remaining portion of this disclosure will focus on a multi-file workspace that includes multiple files of source code.

Here, it is also worthwhile to note that a "collaboration session," as used herein, is an occurrence in which an owner computer system is joined with one or more participant computer systems in order to jointly collaborate on a multi-file workspace. During this collaboration session, the participant computer systems are provided access to a multi-file workspace that is stored locally on the owner computer system. In this manner, the participants need not download the multi-file workspace. Instead, the participant computer systems act as headless units because editing and other operations may be performed on the owner computer system as opposed to occurring on each of the participant computer systems.

Of note, collaboration sessions may be initiated for a broad variety of reasons. For example, in some instances, a collaboration session may be established so that the participants can assist the owner in performing a certain function. For instance, if the collaboration involves debugging, the owner might be the primary person tasked with generating the code, whereas the participants may be other developers who are helping the owner debug that code. In a learning environment, the owner may be a student, and the participant may be a teacher. In an alternative learning environment, a professor may be the owner and his/her students may be the participants. In such a scenario, the professor is able to guide his/her students in demonstrating how the workspace operates. In this context, the owner is able to retain administrative control over his/her multi-file workspace.

Yet another example scenario includes a coding interview process in which the interviewer sets up a workspace environment (e.g., a coding environment). Here, the interviewer is the owner and the interviewee is the participant. In another example scenario, an owner need not be a human on one end of the system. Instead, an owner computer system may be a build server that has no human owner. In this scenario, as will be discussed in more detail later, a human participant, who is using a participant computer system, is able to join a remote codebase (i.e. an "owner" build instance) for the purpose of collaborating in a debugging scenario. Of note, in situations where the owner is a build instance, the disclosed embodiments enable one (or perhaps more) of the participants to assume control of the multi-file workspace. Relatedly, a participant is also able to assume ownership for specific changes to the multi-file workspace.

Having just described some of the situations in which the embodiments may be practiced, the disclosure will now introduce some of the technical benefits that are provided herein. For example, the disclosed embodiments may be implemented to overcome many of the technical difficulties and computational expenses associated with jointly controlling and collaborating on a multi-file workspace. To illustrate, conventional methods for debugging an application often involve each collaborator installing a workspace's global environment/context and then applying the same data (or steps) in order to reproduce the exact issues that led to finding a bug. Such a process consumes a significant amount of time, computing resources, and manpower. As used herein, the term "context" refers to the state of a workspace.

In contrast, the disclosed embodiments provide significant advantages because they enable multiple computers to connect to a single computer, which is running a workspace's environmental logic (e.g., services) and which is maintaining a global context of the workspace, to thereby allow the collaborators to jointly collaborate on the multi-file workspace (as opposed to having multiple different workspaces operating on multiple different computers). These operations result in a significant increase in the overall efficiency of the collaborating computer systems.

Another advantage of the disclosed embodiments is that because only a single workspace is being operated on, the collaborators' operations are synchronized with each other. For example, when multiple collaborators (e.g., code developers) are joined together in a collaborative session, each collaborator is made aware (in real-time) of at least some, and potentially all, of the actions of all of the other collaborators because each collaborator is working on the same workspace. In other words, each collaborator's individual action is "synced" with the actions of the other collaborators.

Having just described various advantages and high-level attributes of some of the disclosed embodiments, the disclosure will now focus on FIG. 1 which presents an introductory discussion of an example computer system. Following that discussion, the disclosure will focus on FIGS. 2 through 9. In particular, these Figures illustrate various architectures and supporting illustrations for providing a collaboration session according to the disclosed principles. Finally, the disclosure will focus on FIGS. 10 through 13 which illustrate various architectures, supporting illustrations, and methods for providing multiple collaborators control over a debugging session.

Example Computer System

As illustrated in FIG. 1, in its most basic configuration, a computer system 100 includes various different components. For example, FIG. 1 shows that computer system 100 includes at least one hardware processing unit 105 (aka "processor"), storage 110, input/output (I/O) interfaces 115, graphics rendering engines 120, and various communication channels 125.

The storage 110 may be physical system memory, which may be volatile, non-volatile, or some combination of the two. Accordingly, the storage 115 may be referred to as a "hardware storage device" on which computer-executable instructions are stored. The term "memory" may also be used herein to refer to non-volatile mass storage such as physical storage media. If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g., as separate threads).

The disclosed embodiments may comprise or utilize a special-purpose or general-purpose computer including computer hardware, such as, for example, one or more processors (such as hardware processing unit 105) and system memory (such as storage 110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware/physical storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors (e.g., data acquisition devices). Further, the computer system 100 may also be connected through one or more wired or wireless network(s) 130 to remote systems(s) that are configured to perform any of the processing described with regard to computer system 100.

The graphics rendering engine 120 is configured, with the processor(s) 105, to render one or more objects on a display of the computer system 100. As a result, a user is able to view the results of the various functionalities of the computer system 100.

A "network," like the network(s) 130 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. As illustrated the computer system 100 includes one or more communication channels 125 that are used to communicate with the network(s) 130. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, cloud-based machines and infrastructures, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

As discussed above, computer systems are able to provide a broad variety of different functions. According to the principles disclosed herein, the embodiments are able to provide a multi-file real-time collaboration environment. Accordingly, attention will now be directed to FIGS. 2 through 9, which figures present various architectures and supporting illustrations for establishing a collaboration session.

Collaboration Session

Figure 2:
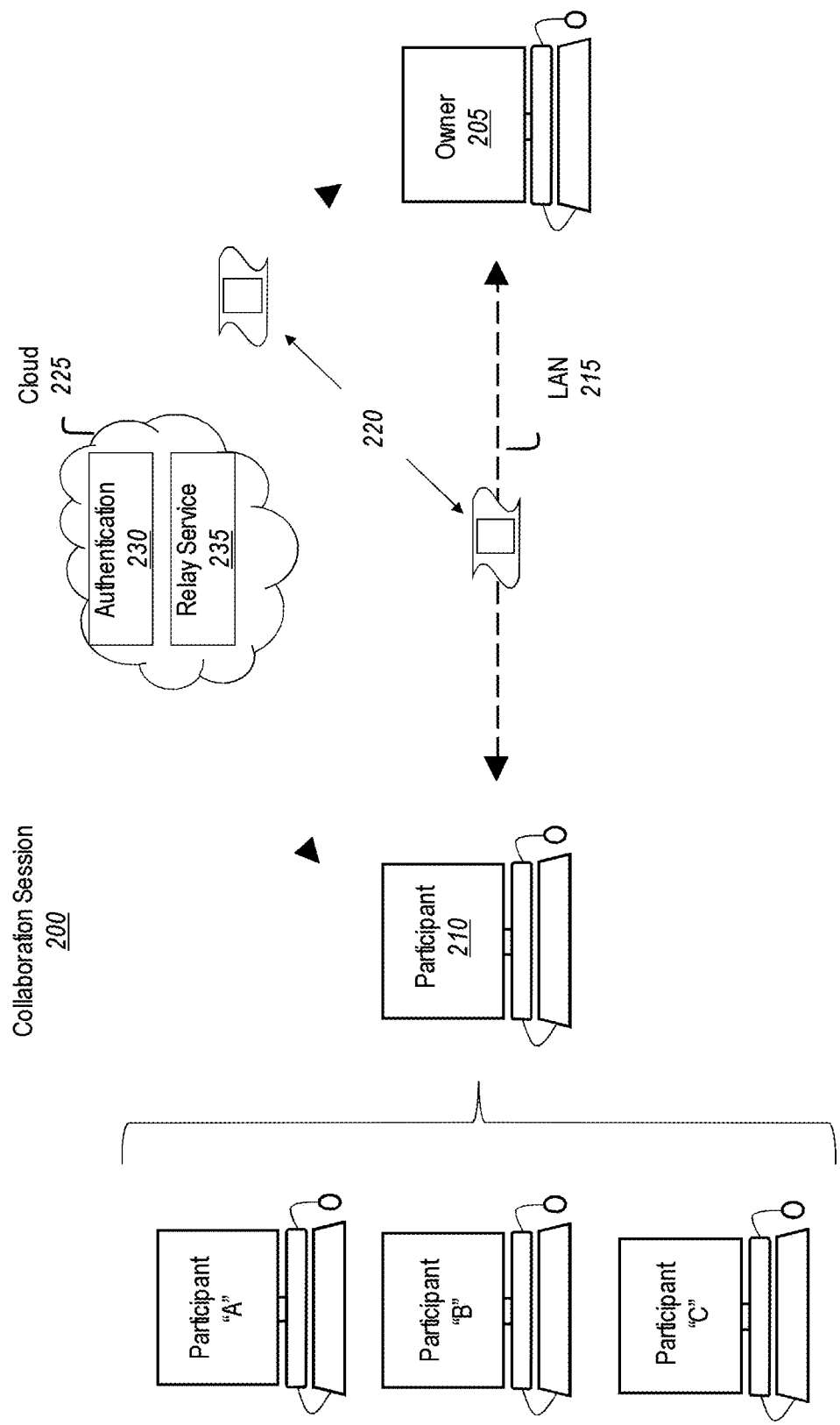
FIG. 2 provides an example depiction of how a collaboration session may be initiated.

FIG. 2 illustrates a collaboration session 200 in which an owner computer system 205 and a participant computer system 210 are both members. Notably, both the owner computer system 205 and the participant computer system 210 may include all of the features and functionalities that were discussed in relation to the computer system 100 of FIG. 1. Accordingly, when reference is made to a "computer system," it will be appreciated that such a system may include the features of computer system 100.

Here, it will be appreciated that there may be any number of participant computer systems in the collaboration session 200. For instance, FIG. 2 shows that Participant "A," Participant "B," and/or Participant "C" may be included in the collaboration session 200. As a result, the owner computer system 205 may be a first member in the collaboration session 200, Participant "A" may be a second member in the collaboration session 200, Participant "B" may be a third member in the collaboration session (i.e. three or more members are joined), and so on with potentially no limit. Accordingly, FIG. 2 is for example purposes only and should not be considered limiting. Furthermore, the remaining portion of this disclosure focuses on collaboration sessions that depict only a single participant; however, it should be understood that the principles may be practiced with any number of participants.

Returning to FIG. 2, the disclosed embodiments establish the collaboration session 200 so that the participant computer system 210 is able to gain access to a multi-file workspace stored on the owner computer system 205. In this manner, the participant computer system 210 can operate on the remote workspace as if the remote workspace were local. For instance, a human participant can independently view, edit, and otherwise operate on the remote workspace. By creating this type of collaboration session, all of the collaborators (e.g., the owner and participant(s)) are all able to collaborate on a single multi-file workspace. Accordingly, the disclosed embodiments provide many efficiencies over traditional collaboration processes.

Here, the collaboration session 200 may be initiated in a variety of ways. In some embodiments, the collaborators (e.g., the owner computer system 205 and the participant computer system 210) are able to communicate with each other over a local area network (LAN) connection 215. When this type of connection is available, then the collaboration session 200 may be initiated by sending a request 220 over the LAN connection 215. In this manner, the collaborators are able to communicate directly in a peer-to-peer manner.

Of note, in some instances, the owner computer system 205 may desire that the participant computer system 210 be authenticated prior to entering the collaboration session 200. As such, the embodiments are able to use the cloud 225 to provide authentication services. For example, some embodiments provide an authentication service 230 in the cloud 225. The participant computer system 210 can use this authentication service 230 to authenticate itself to the owner computer system 205. After the authentication is complete, then the collaboration session 200 can be initiated and the owner computer system 205 and the authenticated participant computer system 210 can jointly work on a multi-file workspace.

In other embodiments, the collaboration session 200 is initiated by sending the request 220 through a relay service 235 operating in the cloud 225. Here, this relay service 235 is able to connect computers that are on different native networks. Accordingly, the embodiments are able to use various services residing in the cloud 225 in order to initiate the collaboration session 200.

Other embodiments use a hybrid approach to initiating the collaboration session 200. For instance, if some participant computer systems are located on the same LAN as the owner computer system 205, then the request 220 can be sent to those participant computer systems using the LAN. Additionally, if some participant computer systems are not using the same LAN as the owner computer system 205, then the request 220 can be transmitted using the relay service 235 in the cloud 225. Accordingly, the disclosed embodiments are able to use a variety of methods for initiating the collaboration session 200. Here, it is worthwhile to note that the disclosed embodiments are able to intelligently select whichever process is most efficient to initiate the collaboration session 200. On a related note, the collaboration session 200 is able to continue to use the respective network connections to maintain the communications between the collaborators.

Ending the collaboration session 200 may be performed in a variety of ways. In some embodiments, the collaboration session 200 ends through an action of one of the collaborators. For example, one of the collaborators may select an "End Collaboration" option.

In another embodiment, the collaboration session may end upon expiration of a time-out period. For example, the owner may have configured a policy controlling how long the collaboration session will remain active. Upon expiration of that period, the participants' connection to the collaboration session will be terminated. Additionally, the owner may set a policy indicating a time-out period associated with the shutting down of a client (e.g., an IDE). For example, the owner may set a time-out period to cause the collaboration session to terminate after a predetermined period of time has elapsed after the client was shut down. Such a feature is beneficial because it provides the collaborators adequate time to save any changes or to provide documentation within the code.

Alternatively, other embodiments are configured to end the collaboration session when the owner computer system shuts down and/or the owner logs off of the owner computer system. In yet another alternative embodiment, the collaboration session may continue to run even after the owner computer system has shut down, gone to sleep, or been logged off. As an example, suppose the human owner decided to perform a quick reboot or had to quickly attend a meeting. Here, because the collaboration session is still active (even though the owner computer system may not be active), the human owner will be able to quickly resume her work when she returns from her activities. An advantage realized by this embodiment is that if any configuration options are adjusted, then those adjustments can be persisted and will be in place for the remaining duration of the collaboration session. In this manner, the collaborators will be able to quickly resume working at the locations where they left off, and they can continue to operate using the same configuration options.

Other embodiments include audit tracking features that record each collaborators' actions (e.g., their edits). In this manner, these embodiments provide an audit trail that can be reviewed and analyzed at a later time, if the need or desire arises. Once the collaboration session ends based on the principles discussed above, then the audit tracking may also end.

Figure 3:
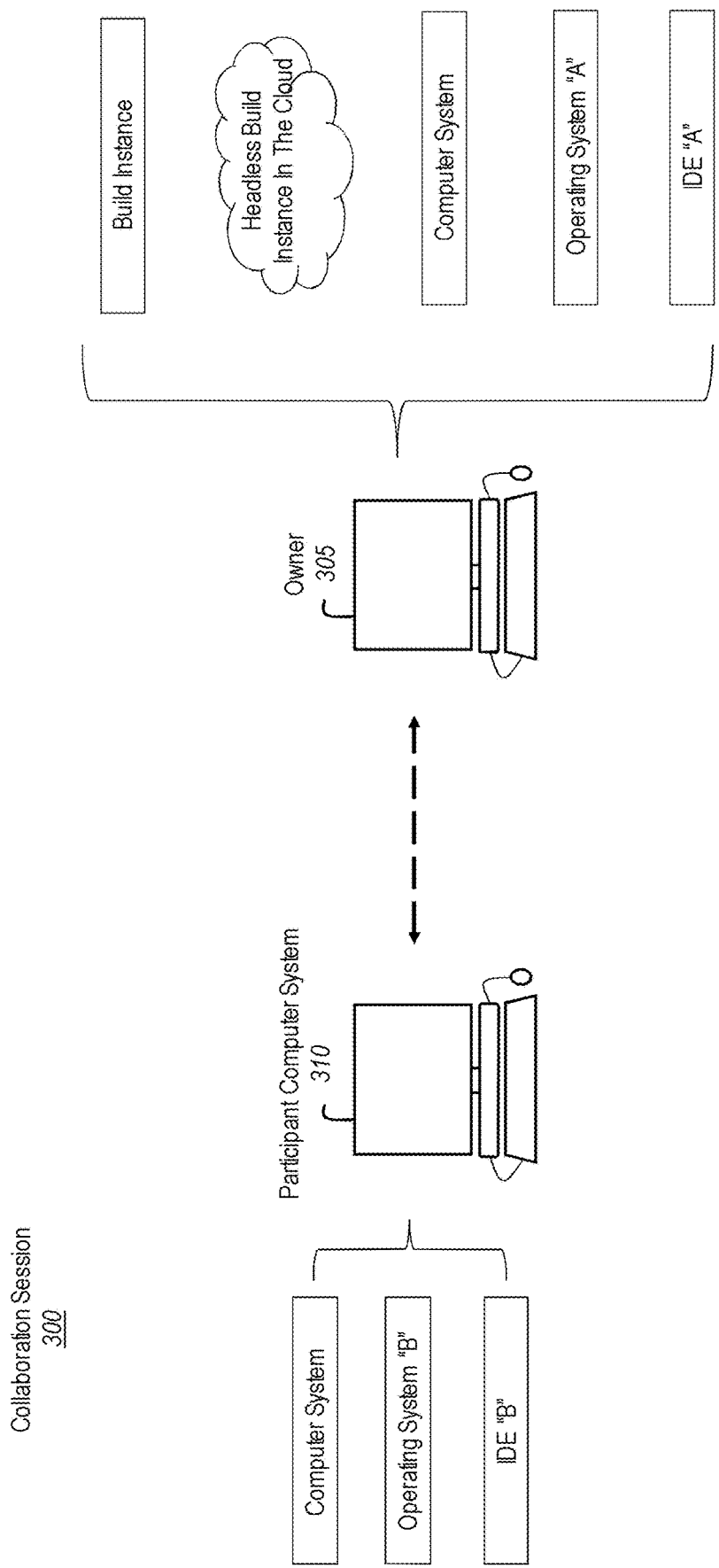
FIG. 3 illustrates the various forms and characteristics that a collaborator may have.

Similar to FIG. 2, FIG. 3 illustrates another collaboration session 300. Here, it will be appreciated that collaboration session 300 is analogous to the collaboration session 200 of FIG. 3. In the scenario presented in FIG. 3, the collaboration session 300 includes an owner 305 and a participant computer system 310.

In particular, FIG. 3 shows some of the various characteristics that the owner 305 and the participant computer system 310 may have. As an example, the owner 305 may not be a computer system with a human operator. Instead, it may be a build instance of an application, as shown in FIG. 3. On a related note, the owner 305 may be a headless build instance that is residing in the cloud. In such a scenario, then the various participants are able to operate on the codebase on which the build instance is based.

Alternatively, the owner 305 may be a computer system (as shown in FIG. 3) that is using a first type of operating system (e.g., Operating System "A"). In some situations, a human owner will operate the owner 305. Furthermore, the human owner is able to perform work on the multi-file workspace through the use of a client application that is residing on the owner 305. As used herein, a "client application" may be any type of application that enables the owner 305 to operate on the multi-file workspace. In situations where the multi-file workspace is a collection of text files, a client application may be a text editor, a word processing program, or any other program suitable to operate on the text files. In situations where the multi-file workspace is a collection of source code files, a client application may be a source code editor, an integrated development environment (IDE), or any other program suitable to operate on source code. Here, it will be appreciated that these client applications are provided permissions to access the multi-file workspace residing on the owner 305. Although FIG. 3 shows that the owner 305 is able to operate a client application that is in the form of an IDE (e.g., IDE "A"), it will be appreciated that any type of client application may be used, not just an IDE.

Turning now to the participant computer system 310, the participant computer system 310 may also be a computer system that is using an operating system (e.g., Operating System "B"). Here it is worthwhile to note that Operating System "B" may be different than Operating System "A." As a result, the owner 305 and the participant computer system 310 need not use the same type of operating system in order to be joined together in the collaboration session 300 to work on the multi-file workspace. Relatedly, the participant computer system 310 need not use the same type of client application (e.g., IDE "B") as the owner 305. Therefore, according to the principles disclosed herein, a participant is able to use his/her preferred operating system and client application regardless of the type of operating system and/or client application that the owner (e.g., owner 305) is using. Accordingly, the embodiments are operating system agnostic and client application agnostic.

Up to this point, the disclosure has presented some of the ways in which a collaboration session may be initiated and some of the characteristics of the collaborators. In light of that background, attention will now be directed to FIG. 4, which presents some architectural components that may be used to realize the benefits of the disclosed principles.

Figure 4:
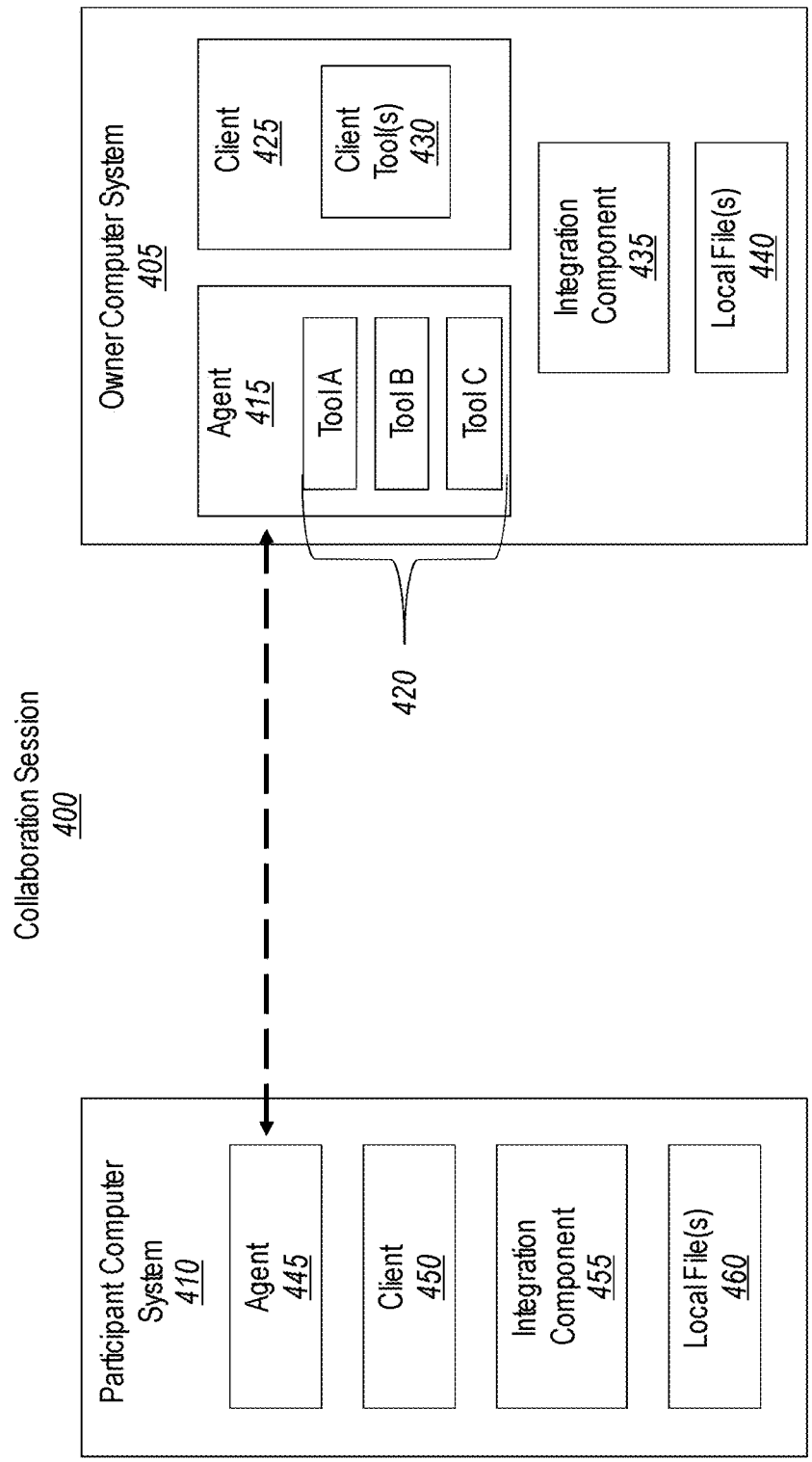
FIG. 4 illustrates an example architecture that may be used to facilitate a collaboration session.

FIG. 4 illustrates a collaboration session 400 in which an owner computer system 405 and a participant computer system 410 are members. Here, the owner computer system 405 is a computer system that includes a collaboration agent 415. As illustrated, this collaboration agent 415 includes a set of base tools 420 (e.g., Tool A, Tool B, and Tool C). Although FIG. 4 shows the collaboration agent 415 as including only three base tools, it will be appreciated that the collaboration agent 415 may include any number of base tools. Additional details on the base tools 420 will be presented momentarily.

The owner computer system 405 also includes a client application 425. As discussed earlier, a client application (e.g., client application 425) may be a text editor, word processing editor, source code editor, IDE, or any other type of application that enables a user to operate on a multi-file workspace. In light of that understanding, client application 425 may include a client tool 430. Similar to the above disclosure, although the client application 425 is shown as including only a single tool, it will be appreciated that the client application 425 may have any number of tools. Relatedly, the owner computer system 405 may have any number of client applications installed thereon. As an example, the client application 425 may be an integrated development environment (IDE) that has permissions to access the multi-file workspace. Further, this IDE may manage/host a set of client development tools. In this manner, the IDE can be used to work on the multi-file workspace.

Here, it will be appreciated that a base tool (e.g., Tool A, Tool B, or Tool C) may be a service or other type of function/tool that is generally common across many or all of the different types of client applications. For example, in the context of code editing, the base tools 420 may include a code completion service, a code debugging service (e.g., a source code error checking tool), a code highlighting service, a code navigation service, a code colorization service (e.g., syntax highlighting in which different colors are applied to the syntax depending on what category a syntax term belongs to), a code refactoring service (e.g., restructuring code without altering its behavior), a code hinting service (e.g., code completion), a source code search tool, a source code control tool, and/or a lightbulb service (e.g., an icon service that provides an expanded display of options).

Additional services and tools include, but are not limited to, providing member lists, parameter information, symbol services, source code transpilation (e.g., changing the source code so it reads in a different coding language), hover features, smart typing abilities, and quick code information. Relatedly, the client tool 430 may be a tool that is specific to a particular client application and that is not generally common among different client applications. As an example, the client tool 420 may be a tool or service specific to a particular type of IDE.

According to the principles disclosed herein, the owner computer system 405 is able to make these set of development tools (i.e. both the set of base tools 420 and the client tool 430) accessible to the participant computer system 410. Because these tools reside on the owner computer system 405, the tools have access to the entire context of the multi-file workspace. By making the tools accessible to the participant computer system 410, a human participant is able to use the tools in light of the entire context of the multi-file workspace. In this manner, the collaborators are able to operate on the multi-file workspace using a set of tools that understand the workspace's entire context.

Returning to FIG. 4, the owner computer system 405 also includes an integration component 435 and a set of local files 440. In some embodiments, the multi-file workspace is included within the set of local files 440 on the owner computer system 405.

As discussed earlier, it is often desirable to enable a team of developers to jointly work on a project. According to the principles discussed here, the collaboration session 400 may be initiated so as to enable one or more participants (e.g., participant computer system 410) to join the owner computer system 405 in collaborating on a multi-file workspace that is stored locally on the owner computer system 405 (e.g., perhaps in the local files 440).

To achieve these benefits, the disclosed embodiments cause the integration component 435 to attach, or rather "hook," to the client application 425 in a lightweight manner. For example, the integration component 435 may be a plugin or other type of client extension that hooks into the client application 425 to perform "redirection," "rerouting," and customization operations. For example, the integration component 435 (which is on the owner computer system 405) is configured to add additional functionalities to the client application 425. Of note, these additional functionalities are at least directed to establishing and maintaining the collaboration session 400.

Figure 5:
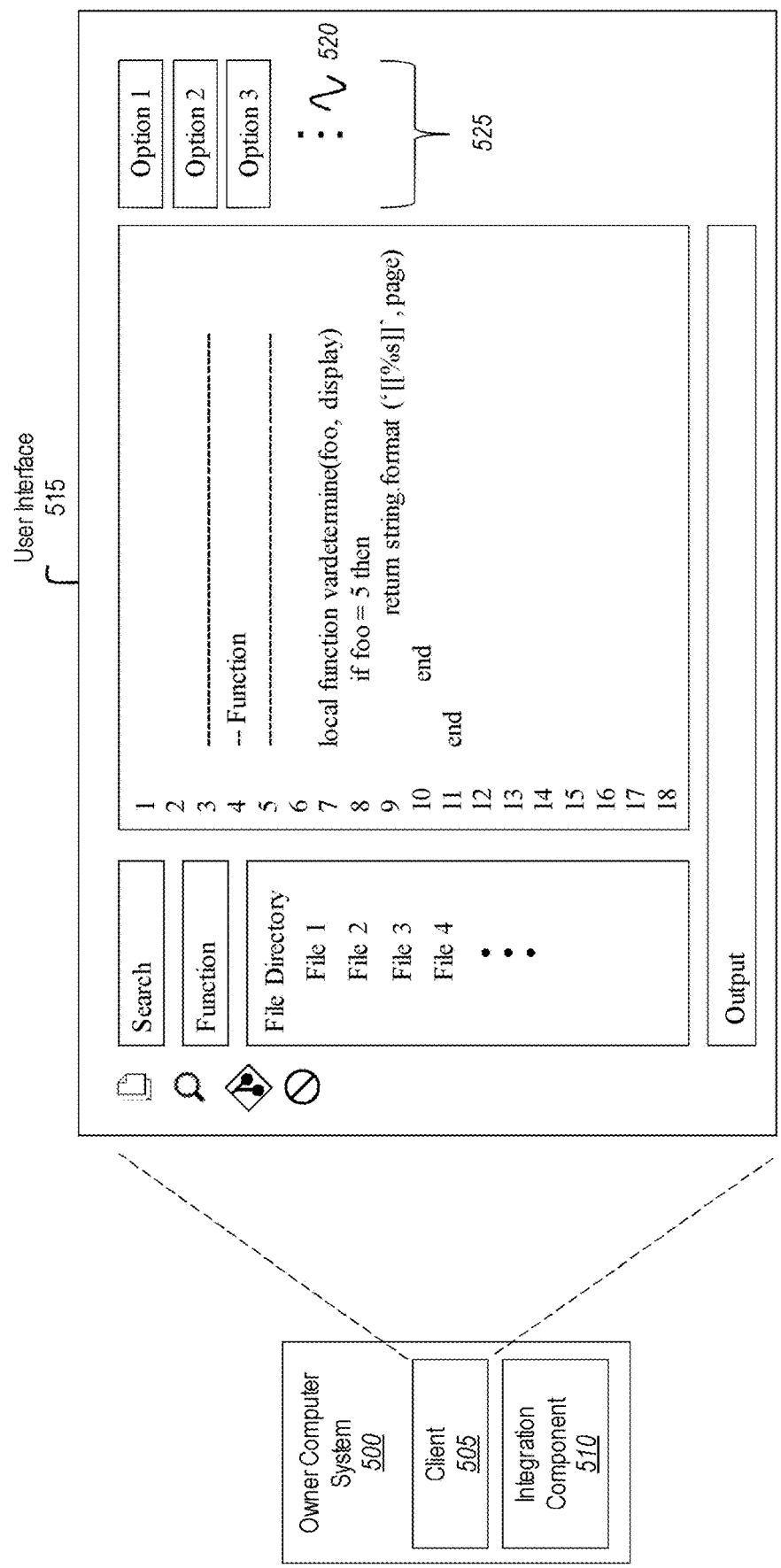
FIG. 5 shows how an integration component is able to configure a client application's user interface so that it includes collaboration options.

To illustrate, FIG. 5 shows an owner computer system 500, which is analogous to the owner computer system 405 of FIG. 4. In FIG. 5, the owner computer system 500 includes a client application 505 and an integration component 510. The client application 505 is also shown as including a user interface 515. After the integration component 510 hooks itself onto the client application 505, then the integration component 510 is able to expand upon the abilities of the client application 505.

For example, in some embodiments, the integration component 510 will alter the user interface 515 so that it includes additional features related to a collaboration session. To illustrate, a set of new collaboration options 525 have been added to the user interface 515 as a result of the integration component 510 attaching itself to the client application 505. The set of new collaboration options 525 include Option 1, Option 2, and Option 3. The ellipses 520 demonstrates that any number of options may be added to the user interface 515. Some of the set of collaboration options 525 may include, but are not limited to, (1) an option to initiate a collaboration session, (2) an option to terminate a collaboration session, and/or (3) an option to acquire information about a particular participant (e.g., the participant's avatar may be displayed and, when the avatar is selected, identifying information about the participant may be displayed).

Another option is a "pin" to participant's position option. As discussed, the embodiments enable a participant to work on a multi-file workspace that is stored locally on an owner computer system. Included with this functionality is the ability of the participant to independently navigate to areas within the multi-file workspace where the owner computer system is not currently operating (or even in locations where the owner computer system is operating). Furthermore, the embodiments also enable the participant to independently edit files. In light of these abilities, an owner may desire to learn where a participant is currently navigating/operating within his/her multi-file workspace.

By selecting the pin to participant's position option (e.g., the options can be selectable buttons), the embodiments automatically navigate the owner to the same location as a participant within the workspace. If there are multiple participants, then the owner may initially be prompted to select a particular participant. As an example, suppose an owner is editing File 1 shown in the user interface 515 in FIG. 5. At the same time, a participant may be independently editing File 2. By clicking the pin to participant's position option, the owner can be automatically navigated to File 2, and in particular to the exact location where the participant is editing File 2. Therefore, although the embodiments enable participants to independently navigate and edit the files within the workspace, the embodiments also enable the owner to be automatically directed to the locations within the workspace where the participants are working. In some embodiments, this feature is also provided to each of the participants. Therefore, in these embodiments, each collaborator is able to follow the actions of the other collaborators.

Another option that may be provided among the set of new collaboration options 525 is the option to adjust the access controls of the participants. For example, the owner may be provided with an option to adjust a policy so that participants are allowed to navigate to or edit only certain files. Yet another option is related to an audit feature in which the actions of the participants are recorded and are made available for viewing by the owner. Accordingly, the integration component 510 is able to interact with the client application 505 to enhance the owner's control over the participants in a collaboration session.

Returning to FIG. 4, attention will now be directed to the participant computer system 410. Here, the participant computer system 410 is shown as including a collaboration agent 445, a client application 450, an integration component 455, and local files 460. Here, the collaboration agent 445 communicates with the collaboration agent 415 to provide the participant computer system 410 access to the multi-file workspace residing on the owner computer system 405. Additional details on this interaction will be presented later. At this point, it is worthwhile to note that the client application 450 also provides a user interface to the participant so that the participant is able to view (and therefore work on) the multi-file workspace.

Similar to the integration component 435, the integration component 455 also attaches itself to the client application 455. The functionalities of this integration component 455 will now be discussed in relation to FIGS. 6A and 6B.

Figure 6B:
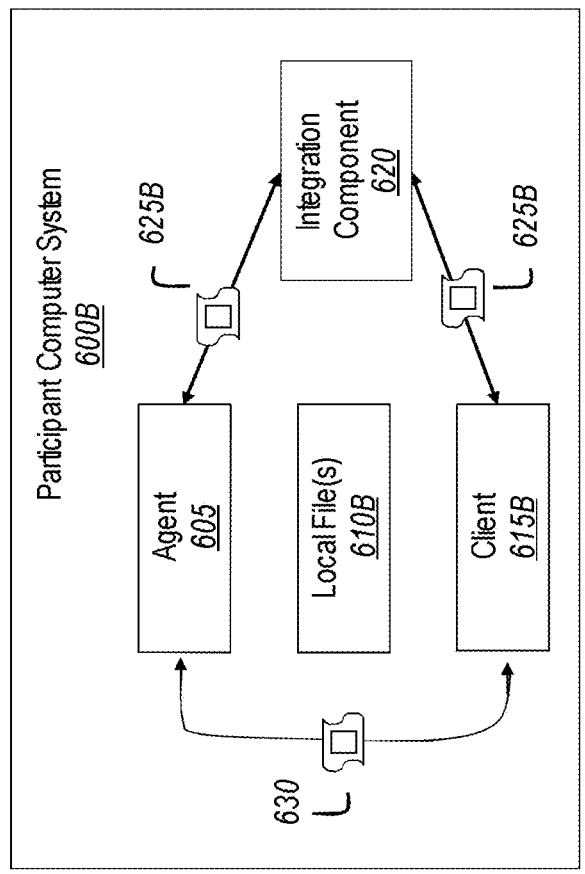
FIG. 6B illustrates how a client application's communications can be intercepted and re-routed.
Figure 6A:
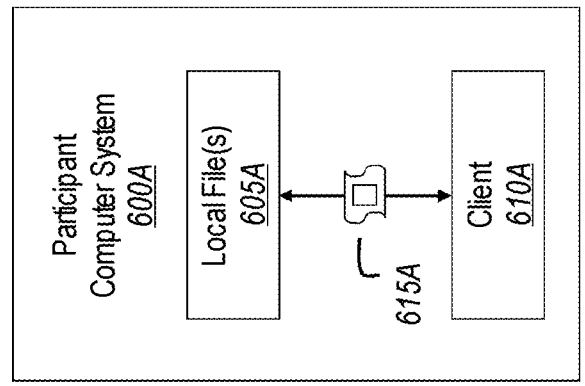
FIG. 6A illustrates how a client application is able to access the local files on a participant computer system.

FIG. 6A shows a participant computer system 600A that includes a set of local files 605A, which are analogous to the local files 460, and a client application 610A. In this scenario, the participant computer system 600A does not have an integration component. Accordingly, when the participant computer system 600A is thusly configured, the client application 610A is able to submit requests 615A to the set of local files 605A. In this manner, the client application 610A operates on files that are stored locally on the participant computer system 600A.

To enable a participant computer system to operate on a remote multi-file workspace in an operating system agnostic and client application agnostic manner, the participant computer system uses a collaboration agent and an integration component. These features are shown in FIG. 6B. For example, the participant computer system 600B of FIG. 6B includes a collaboration agent 605, a set of local files 610B, a client application 615B, and an integration component 620. After attaching itself to the client application 615B, the integration component 620 is able to intercept requests 625B that are issued by the client application 615B. Normally, these requests 625B would be fulfilled using the set of local files 610B. Now, instead of the requests 625B being fulfilled using the information from the set of local files 610B, the integration component 620 intercepts those requests 625B and routes the intercepted requests 625B to the collaboration agent 605. Once the requests 625B are received, the collaboration agent 605 then routes the intercepted requests 625B to a collaboration agent residing on the owner computer system (e.g., collaboration agent 415 in FIG. 4).

Figure 7:
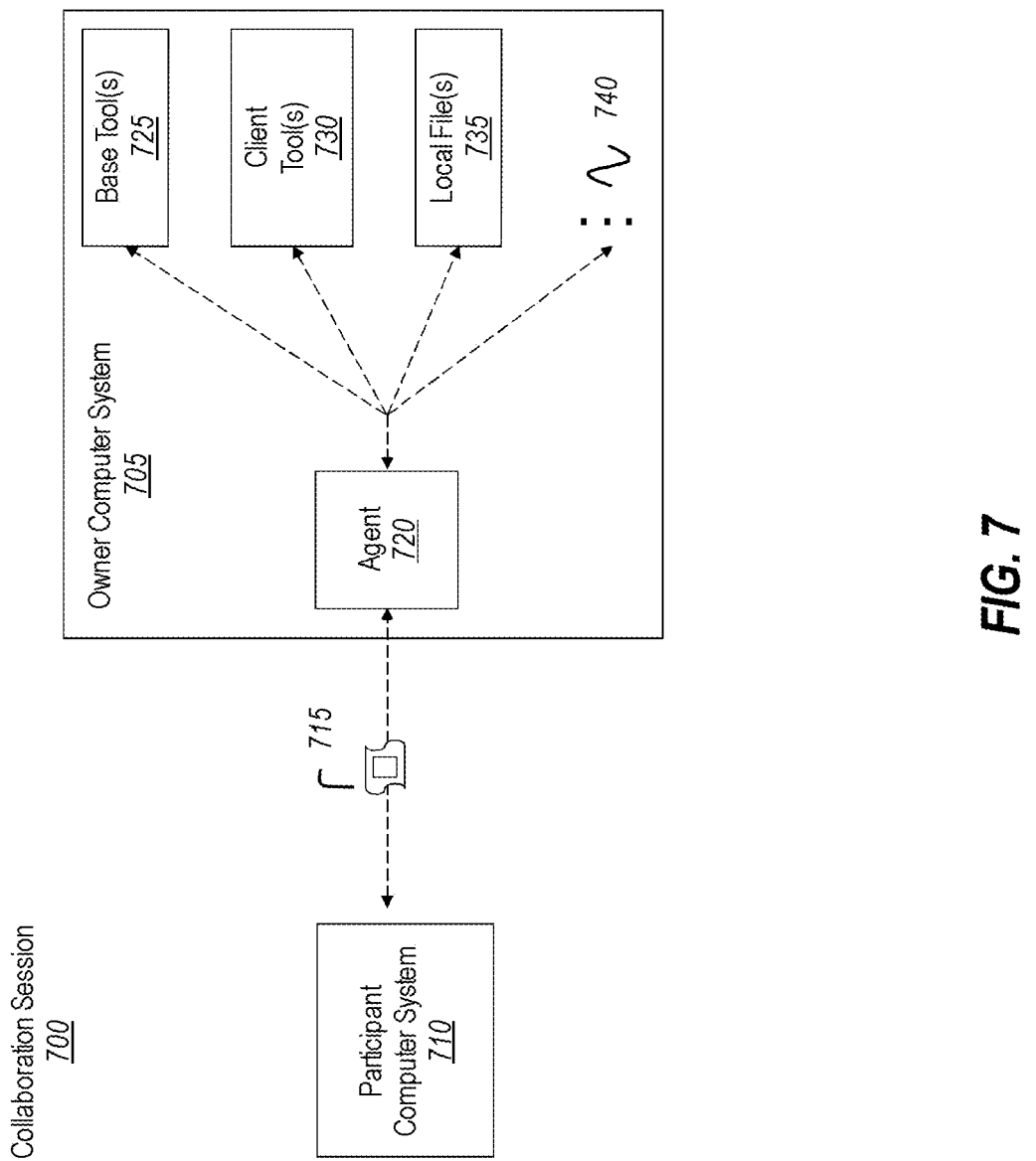
FIG. 7 demonstrates how an owner computer system is able to process requests submitted by a participant computer system.

Turning briefly to FIG. 7, FIG. 7 shows how an owner-side collaboration agent handles requests that are received from a participant-side collaboration agent. Here, the collaboration session 700 includes an owner computer system 705 and a participant computer system 710. The owner computer system 705 includes a collaboration agent 720, a set of base tools 725, a set of client tools 730, and a set of local files 735. The ellipses 740 demonstrates that the owner computer system 705 may have additional features.

In this scenario, a participant-side collaboration agent is able to receive an intercepted request as described in connection with FIG. 6B. This request is shown as request 715 in FIG. 7. Here, the participant-side collaboration agent transmits the request 715 to the collaboration agent 720. After receiving the request 715, the collaboration agent 720 then processes the request 715. In some instances, processing the request 715 includes making the set of base tools 725 accessible to the participant computer system 710. Relatedly, processing the request 715 may include making the set of client tools 730 accessible to the participant computer system 710. In other instances, processing the request 715 may include making the set of local files 735 accessible to the participant computer system 710. In this manner, a multi-file workspace residing on the owner computer system 705 may be made accessible to the participant computer system 710. In some instances, processing the request 715 includes making edits to the files in the multi-file workspace. Edits include, but are not limited to, changing text within the file, adding a new file, deleting an existing file, or any other file editing operations.

Here, it is worthwhile to note that the participant computer system 710 is not downloading the multi-file workspace. Instead, it is being given access to the workspace through the use of its collaboration agent, its integration component, and the owner-side collaboration agent. In this manner, the participant computer system 710 is able to reach across and perform work on the owner computer system 705's multi-file workspace. After the request 715 is processed by the owner computer system 705, the collaboration agent 720 then transmits a response back to the participant computer system 710. In particular, the collaboration agent 720 transmits the response back to the participant-side collaboration agent.

Returning to FIG. 6B, the collaboration agent 605 will then receive any responses generated by an owner computer system. Once a response is received, then some embodiments will cause the response to be transmitted back to the client application 615B via the integration component 620. In other embodiments, however, the collaboration agent 605 is able to directly transmit the response (e.g., response 630) to the client application 615B. In this manner, the participant is able to see the results of his/her processed requests.

Here, an example will be helpful. Suppose an owner establishes a collaboration session in which a participant is a member. The owner has asked the participant to assist him/her in debugging source code. The owner begins by debugging a first file while the participant begins by debugging a second file. Of note, both of these files are included in the multi-file workspace and both are stored on the owner's computer system. In this example, the second file is displayed on the participant's computer system even though the file's contents are actually stored only on the owner's computer system.

Additionally, the participant is able to independently view and edit the contents of the second file even though the owner is currently working on the first file. In this manner, multiple collaborators are able to jointly work on a single multi-file workspace. In some instances, the owner and the participant will be working on the same file. When such a scenario is present, then the owner will be able to see (in real-time) the changes made by the participant, and the participant will be able to see (in-real time) the changes made by the owner. Accordingly, the changes made by the collaborators are made in real-time and are synchronized with each other. In light of this discussion, it will be appreciated that the participant is given the illusion that he/she is working on a local workspace whereas, in actuality, the workspace is not local.

By following these principles, the disclosed embodiments are able to provide a participant computer system access to a multi-file workspace that is stored on the owner computer system. Furthermore, a human participant is able to view that workspace and to edit that workspace. This viewing and editing can be performed independently of any viewing and editing that an owner may be performing on the multi-file workspace. In this manner, a participant no longer needs to replicate a workspace's context in order to work on that workspace. Additionally, the participant is able to use his/her preferred client application, even if that client application is different from the owner's client application. Even further, the participant is able to use the owner's set of tools, which tools understand the entire context of the multi-file workspace.

Figure 8:
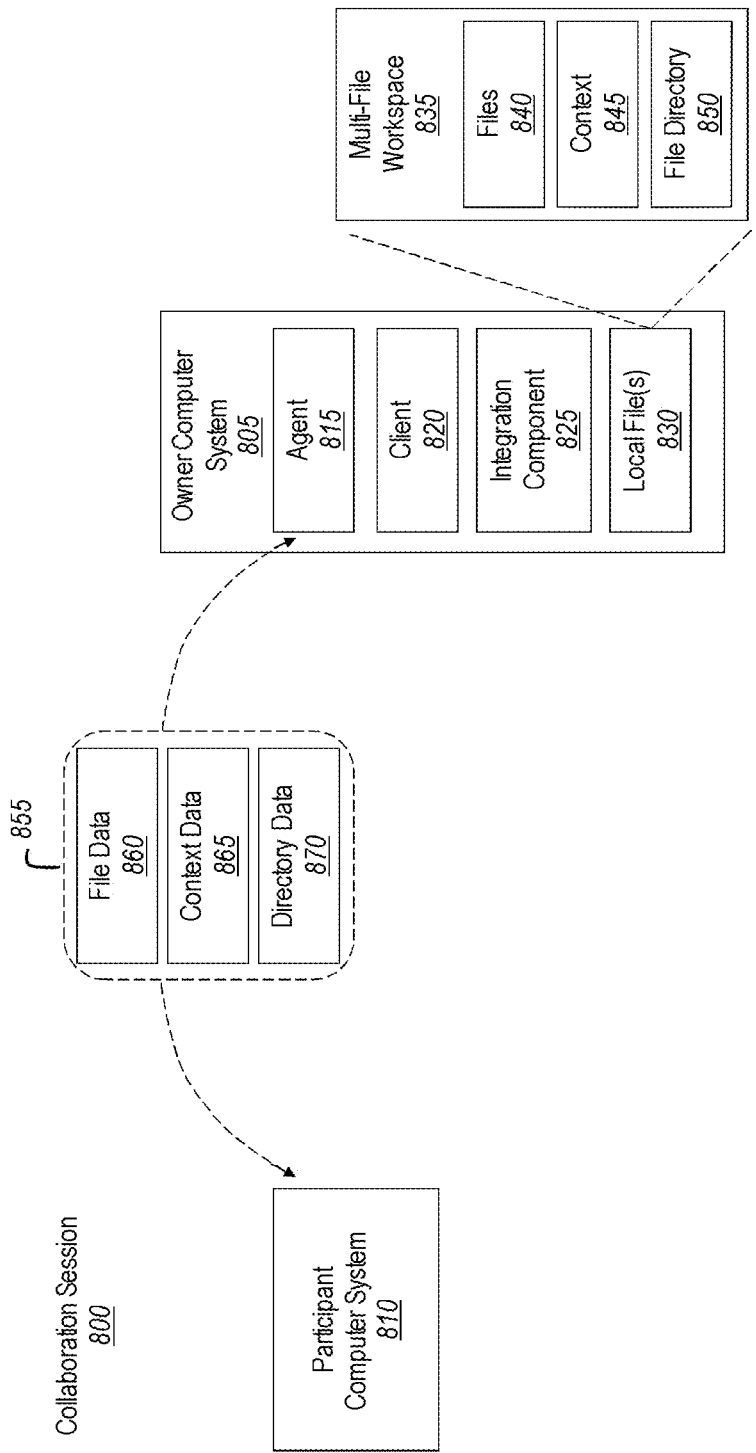
FIG. 8 demonstrates how a multi-file workspace can become accessible to a participant computer system.

Attention will now be directed to FIG. 8, which provides additional details for enabling a participant to collaborate on a multi-file workspace. Here, the collaboration session 800 includes an owner computer system 805 and a participant computer system 810. The owner computer system 805 includes a collaboration agent 815, a client application 820, an integration component 825, and a set of local files 830. The set of local files 830 includes a multi-file workspace 835. Here, this multi-file workspace 835 includes a set of files 840, a context 845 of the multi-file workspace 835, and a file directory 850.

When the collaboration agent 815 receives a request from the participant computer system 810 according to the manner just described, the collaboration agent 815 is able to process the request and return a response 855 to the participant computer system 810. As shown, this response 855 may include file data 860 (i.e. data concerning the set of files 840), context data 865 (i.e. data concerning the context 845), or directory data 870 (i.e. data concerning the file directory 850). In some instances, this data is metadata while in other instances this data enables the participant computer system 810 to display the multi-file workspace and receive edits directed to the multi-file workspace. In this manner, providing the participant computer system 810 access to the multi-file workspace includes providing access to the workspace's file directory, context, and files. From this information, the multi-file workspace 835 can be displayed on the participant computer system 810, and the participant will be able to operate on that multi-file workspace.

From the above disclosure, it will be appreciated that the owner computer system 805 is transmitting sufficient information (e.g., metadata and other information) so that the participant computer system 810 is able to understand what is included within the multi-file workspace 835. Furthermore, the participant computer system 810 is able to receive enough information so that a visualization of the multi-file workspace 835 may be rendered on a user interface of the participant computer system 810. In this manner, the participant computer system 810 is acting as a headless entity because a majority of the operations are actually being performed on the owner computer system 805.

For example, the participant computer system 810 submits viewing and editing requests to the owner computer system 805. The owner computer system 805 then processes those requests and returns results back to the participant computer system 810. As such, the participant computer system 810 is provided the illusion that it is working on a local workspace, but in actuality the workspace is not local and the operations on the workspace are being performed by the owner computer system 805.

Figure 9:
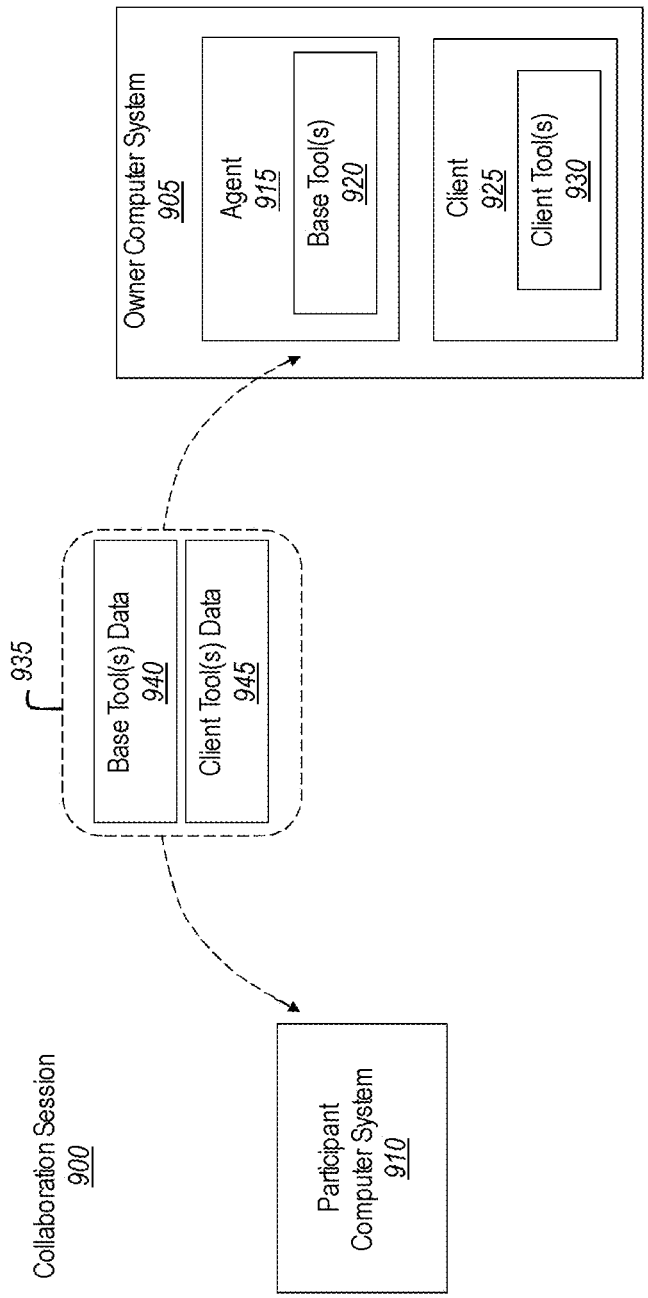
FIG. 9 demonstrates how the tools of an owner computer system can become accessible to a participant computer system.

FIG. 9 shows some additional operations that may be performed. Here, the collaboration session 900 includes an owner computer system 905 and a participant computer system 910. The owner computer system 905 includes a collaboration agent 915. As discussed, this collaboration agent 915 is able to maintain a set of base tools 920. The owner computer system 905 also includes a client application 925, which client application 925 is able to maintain a set of client tools 930.

According to the principles discussed herein, the embodiments are also able to make the set of base tools 920 and the set of client tools 930 accessible to the participant computer system 910. For example, the participant computer system 910 is able to use the tools that are residing on the owner computer system 905 in order to perform operations on the owner computer system 905's multi-file workspace. Therefore, not only is the participant computer system 910 able to view and edit the multi-file workspace on the owner computer system 905, but it is also able to make use of the tools that are on the owner computer system 905. The participant computer system 910 is able to receive information 935 that includes base tool data 940 and/or client tool data 945. In this manner, the participant computer system 910 is able make use of the owner computer system 905's development tools.

Debugging with Multi-Collaborator Control

Having just described some of the benefits of establishing a collaboration session, the disclosure will now focus on various debugging features that are available within a debugging session. Accordingly, FIGS. 10 through 13 provide additional insight regarding these debugging features.

Initially, it is noted that a client application (e.g., an IDE), as used herein, is able to compile, build, execute, and/or debug an application's source code. As discussed throughout this disclosure, a workspace (e.g., an application) may include multiple files of source code. In many instances, however, it may be desired to debug the application. As a result, the IDE is able to perform a build on that application and initiate/create a build instance. Here, it is worthwhile to note that any collaborator (e.g., the owner or any of the participants) may initiate the creation of a build instance of source code. To clarify, even though the source code resides only on the owner computer system, any one of the collaborators can trigger when the build instance will be created.

Once the build instance is created, then a human developer can use the IDE to debug the application. The process of debugging the application may include issuing various debug commands against the build instance. As an example, a debug command may be a step forward command, a step backward command, a step into command, a step over command, or even an execute to breakpoint command. As used in the context of a debugging scenario, a "step backward" command causes the debugger to present historical debugging information to the developer. As an example, when the step backward command is performed, the debugger may present information that was generated previously and that is being displayed again in response to the step backward command (i.e. the step backward command may display a "historical view" of the execution steps). In some instances, the source code's execution does not actually progress in a backward manner. Instead, the source code's execution is paused, and then historical debugging data is displayed in response to the step backward command. In this manner, a developer is able to replay past debugging information in an effort to better understand how the source code operates. These commands cause various portions of the source code to execute and to generate debugging data.

Here, it is worthwhile to note that as these commands are executed, the build instance experiences various different stop events. For example, human developers often place breakpoints in a body of source code. Once the built/compiled source code is run, the source code will execute up to the location of the breakpoint, and then the execution pauses until a subsequent debug command is issued.

When such a stop event occurs, some (or all) of the threads, cached data, the callstack, memory instances, and other aspects of an executing application are simply paused, not terminated. Because the execution is paused, a human developer will be able to examine the source code's variable values, thread statuses, the callstack, and other attributes of the application through use of the IDE. In this manner, the human developer is able to debug an application.

The disclosed embodiments provide these valuable benefits to multiple collaborators at the same time through the use of a collaboration session. For example, even though multiple collaborators are present in the session, each of the collaborators retains the ability to independently view and navigate the compiled and executed source code.

Figure 10:
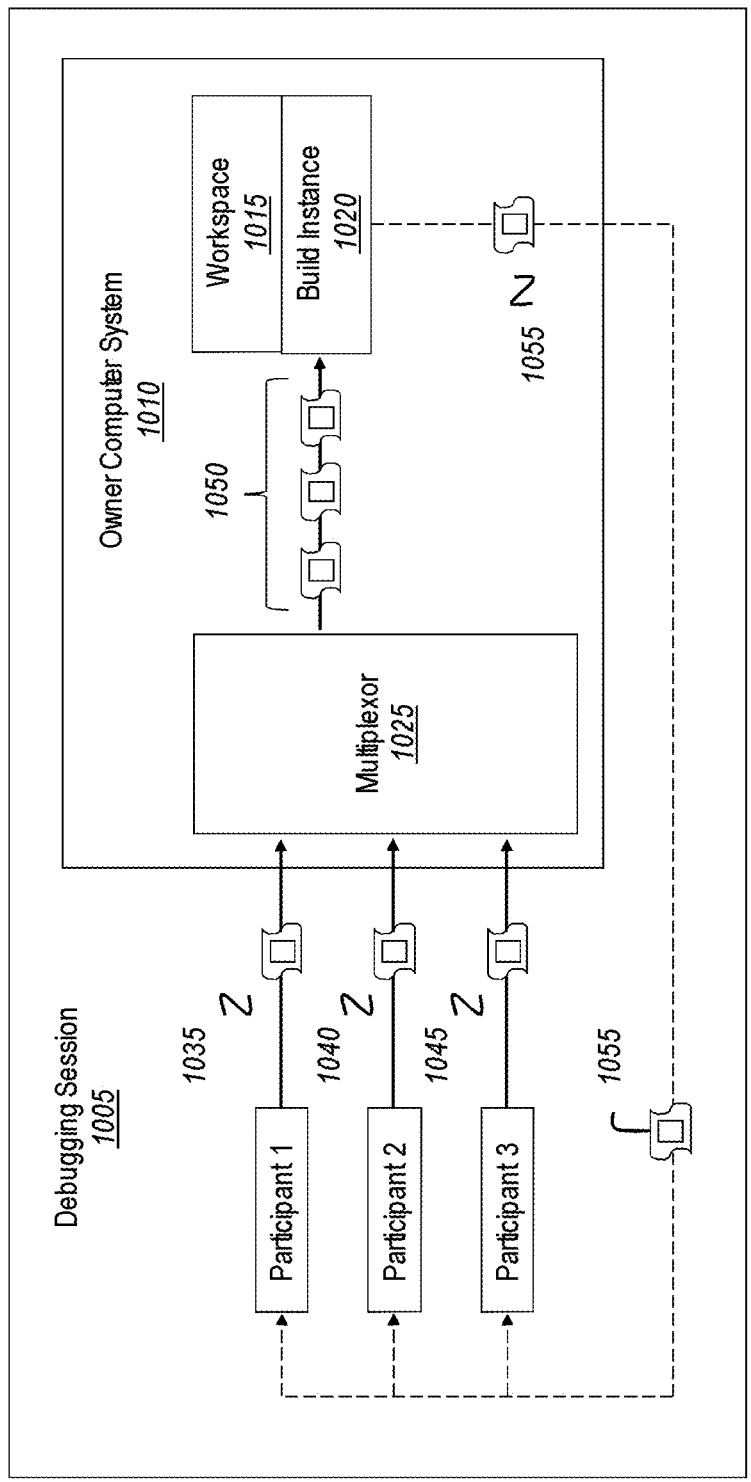
FIG. 10 depicts an example architecture for multiplexing debug commands.

Accordingly, attention will now be directed to FIG. 10 which illustrates an example scenario in which multiple collaborators are able to jointly debug a body of source code. In particular, this figure initially shows a collaboration session 1000. As discussed earlier, a collaboration session (e.g., collaboration session 1000) may include any number of participant computer systems. These participant computer systems will be joined with an owner computer system. Together, these collaborators (e.g., the owner computer system and the participant computer systems) are able to operate on a multi-file workspace (e.g., an application) that is stored locally on the owner computer system. After operating on the application (e.g., by editing the application's source code), it may be desired to compile, build, execute, and debug the application. Accordingly, the disclosed embodiments enable any one of the collaborators (e.g., the owner or the participants) to initiate a debugging session which is shown as debugging session 1005 in FIG. 10.

Here, this debugging session 1005 includes an owner computer system 1010 and three participant computer systems (e.g., Participant 1, Participant 2, and Participant 3). The owner computer system 1010 includes a multi-file workspace 1015 (e.g., an application that includes multiple files of source code), a build instance 1020 of the workspace 1015, and a multiplexor 1025 (i.e. the multiplexor 1025 is residing on the owner computer system 1010). Although not shown in FIG. 10, it will be appreciated that the owner computer system 1010 also includes a client application (e.g., an IDE) that is able to compile, build, execute, and debug the workspace 1015 as well as a collaboration agent.

This figure also illustrates that both the workspace 1015 and the build instance 1020 are stored locally on the owner computer system 1010. It will be appreciated that some embodiments store this information in the cloud. The output of the build instance 1020 is then made available (i.e. it is accessible) to all of the collaborators (i.e. the owner computer system 1010, Participant 1, Participant 2, and Participant 3) via the debugging session 1005. To clarify, the process of providing access to the build instance also includes the process of providing the build instance's output to each of the collaborator computer systems.

In this manner, the owner computer system 1010 is the entity providing the debugging services, diagnostic services, and build services. It will be appreciated, however, that the owner computer system 1010 is making its debugging services, diagnostic services, and build services available to some (or all) of the participant computer systems. Indeed, the participant computer systems are able to query the owner computer system 1010's debugging services so that each participant computer system is able to independently view/access the debugging information.

As described above, the debugging process often includes issuing various debug commands. Such a scenario is presented in FIG. 10. Here, Participant 1 is issuing a debug command 1035, Participant 2 is issuing a debug command 1040, and Participant 3 is issuing a debug command 1045. Although the owner computer system is not shown as issuing a debug command, such an event may occur.

According to the disclosed embodiments, the multiplexor 1025 is able to receive these debug commands (e.g., debug commands 1035, 1040, and 1045) and multiplex them. As used herein, "multiplex" refers to the process of receiving (in parallel) debug commands from multiple different sources, organizing those debug commands into a determined order, and then transmitting (serially) those debug commands to another entity. As illustrated in FIG. 10, the multiplexor 1025 is able to initially receive debug commands (e.g., debug commands 1035, 1040, and 1045) in a parallel manner. It then organizes these debug commands (e.g., based on the time that they were received). Finally, it transmits those debug commands to another entity (e.g., an IDE that is being used to debug the build instance 1020) in a serial manner. The debug commands 1050 illustrate the output of the multiplexor 1025.

These debug commands 1050 are then executed against the build instance 1020 to generate debugging results 1055. Here, it is worthwhile to note that because the build instance 1020 is stored on the owner computer system 1010, the debugging results 1055 are generated by the owner computer system 1010. Of note, however, these debugging results 1055 are provided to the collaborators (e.g., the owner computer system 1010, Participant 1, Participant 2, and Participant 3). Therefore, although the debugging services are being performed on the owner computer system 1010, the debugging results 1055 are published/broadcast to some (or all) of the participant computer systems. In this manner, each collaborator (i.e. the owner computer system 1010, Participant 1, Participant 2, and Participant 3) is able to independently view and inspect the debugging results 1055.

Figure 11:
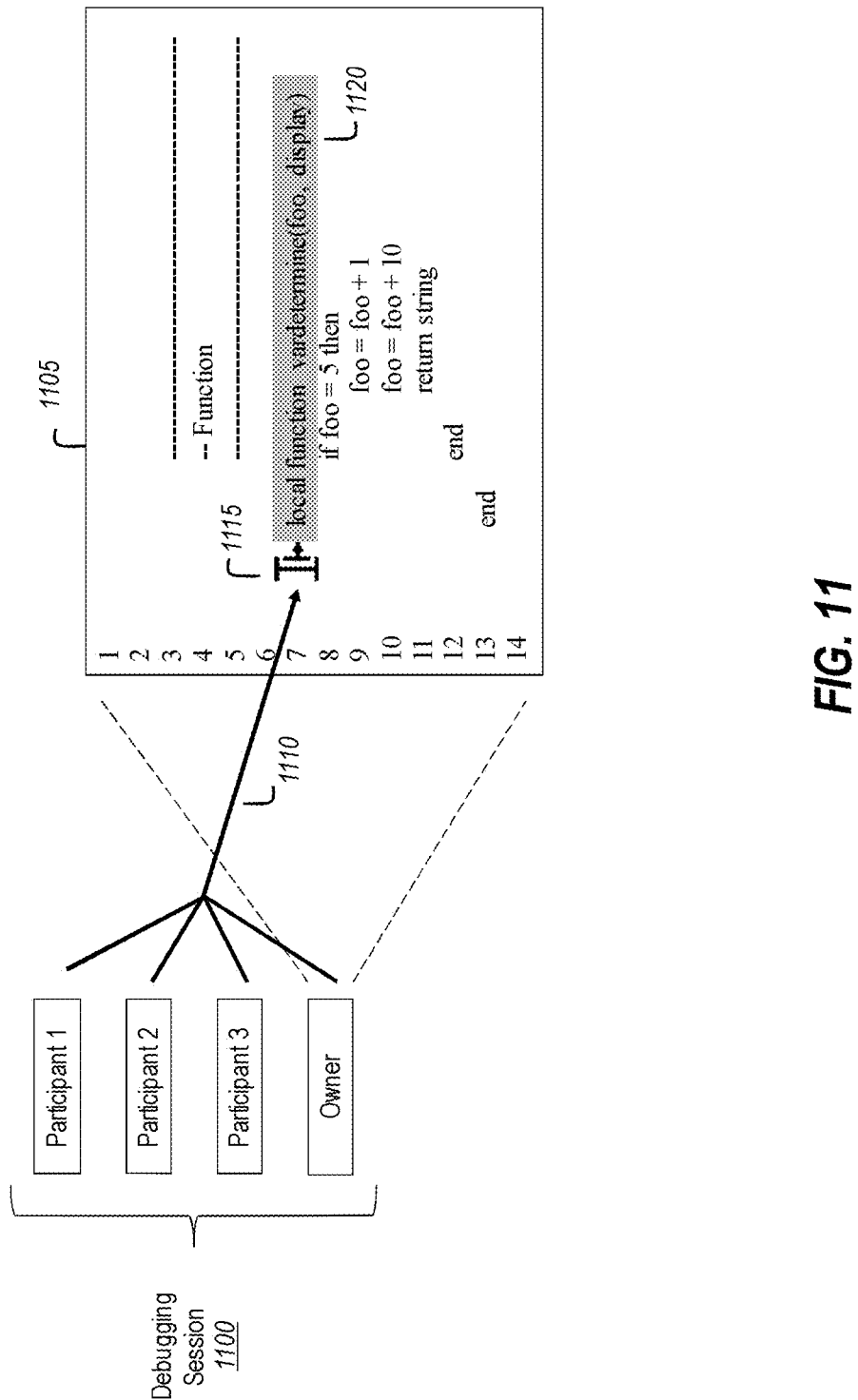
FIG. 11 shows how multiple collaborators are able to share a debug cursor.

FIG. 11 provides another example illustration of how a debugging session allows each collaborator to view debugging results. Here, this figure shows a debugging session 1100 in which an owner computer system and three participant computer systems (e.g., Participant 1, Participant 2, and Participant 3) are members. Furthermore, this figure shows a body of built/compiled source code 1105 that is stored locally on the owner computer system.

According to the principles discussed with respect to FIG. 10, each of the collaborators are able to independently submit debug commands that will be executed by the owner computer system. Here, it will be appreciated that the collaborators (i.e. the owner computer system, Participant 1, Participant 2, and Participant 3) are all operating on the same build instance. Stated differently, the collaborators are all sharing 1110 a single "debug cursor" (e.g., debug cursor 1115). As used herein, a "debug cursor" is not actually visualized on a user interface but it is provided in these figures to signify where a stop event has occurred in the executing source code. In other words, the debug cursor (e.g., debug cursor 1115) signifies which portion of the source code will be executed next. As shown in FIG. 11, a stop event has occurred in the compiled source code 1105 at line item 7 (illustrated by the highlighted code 1120). Accordingly, all of the collaborators share this debug cursor 1115. Furthermore, when the collaborators submit debug commands, they cause this debug cursor 1115 to progressively execute through the compiled source code 1105. In this manner, the collaborators are able to share control of a single debug cursor.

Here, an example will be helpful. Suppose Participant 1 issued a first debug command, Participant 2 issued a second debug command, and Participant 3 issued a third debug command. Suppose also that each of these debug commands is a step forward command (i.e. only one program statement is executed at a single time). Further suppose that the compiled source code 1105 was previously executed up to line 7 (i.e. a stop event occurred at line 7). As shown, the debug cursor 1115 indicates that the code beginning at line 7 will be the next program statement to be executed.

A multiplexor (e.g., multiplexor 1025 shown in FIG. 10) will initially receive the three debug commands, serialize them, and pass them to the IDE for execution. In response to the first debug command, which is a step forward command, the compiled source code 1105 will be executed one program statement. As a result, a stop event will cause the execution to pause at line 8, and the debug cursor 1115 will now be at line 8. Notably, as a result of this execution, new debugging results will now available. The new debugging results will be published to each of the collaborators (e.g., see the debugging results 1055 in FIG. 10). As a result, each collaborator will be able to see the debugging results.

Next, the second step forward command will be executed. Similar to the above discussion, this second step forward command will cause one program statement to be executed, new debugging results will be generated, a new stop event will occur, and the debug cursor 1115 will move to line 9.

Finally, the third step forward command will be performed and the same events will occur. This time, the debug cursor 1115 will move to line 10. In this manner, the collaborators are all able to independently submit debug commands. Of note, however, those debug commands will cause the debug cursor 1115 to progress in accordance with the debug command. Because this debug cursor 1115 is shared by all of the collaborators, the action of one collaborator will influence what information (e.g., debugging results) is available to the other collaborators. While the above example was focused on the execution of step forward commands, it will be appreciated that the embodiments are able to employ any type of debug command.

As illustrated in FIG. 11, some embodiments highlight the program statement that corresponds to the debug cursor 1115. This highlighting may be viewable on each of the collaborators' user interfaces. In this manner, each human collaborator will be able to visibly see where the execution of the source code is currently paused. It will be appreciated that this highlighting will move as debug commands are executed. It follows then that a human collaborator may witness the highlighting progressively move even though he/she did not submit a debug command. Such a scenario occurs because, as discussed, all of the collaborators are sharing the same debug cursor 1115 (i.e. all collaborators are tied to the same execution of the compiled source code 1105).

Figure 12:
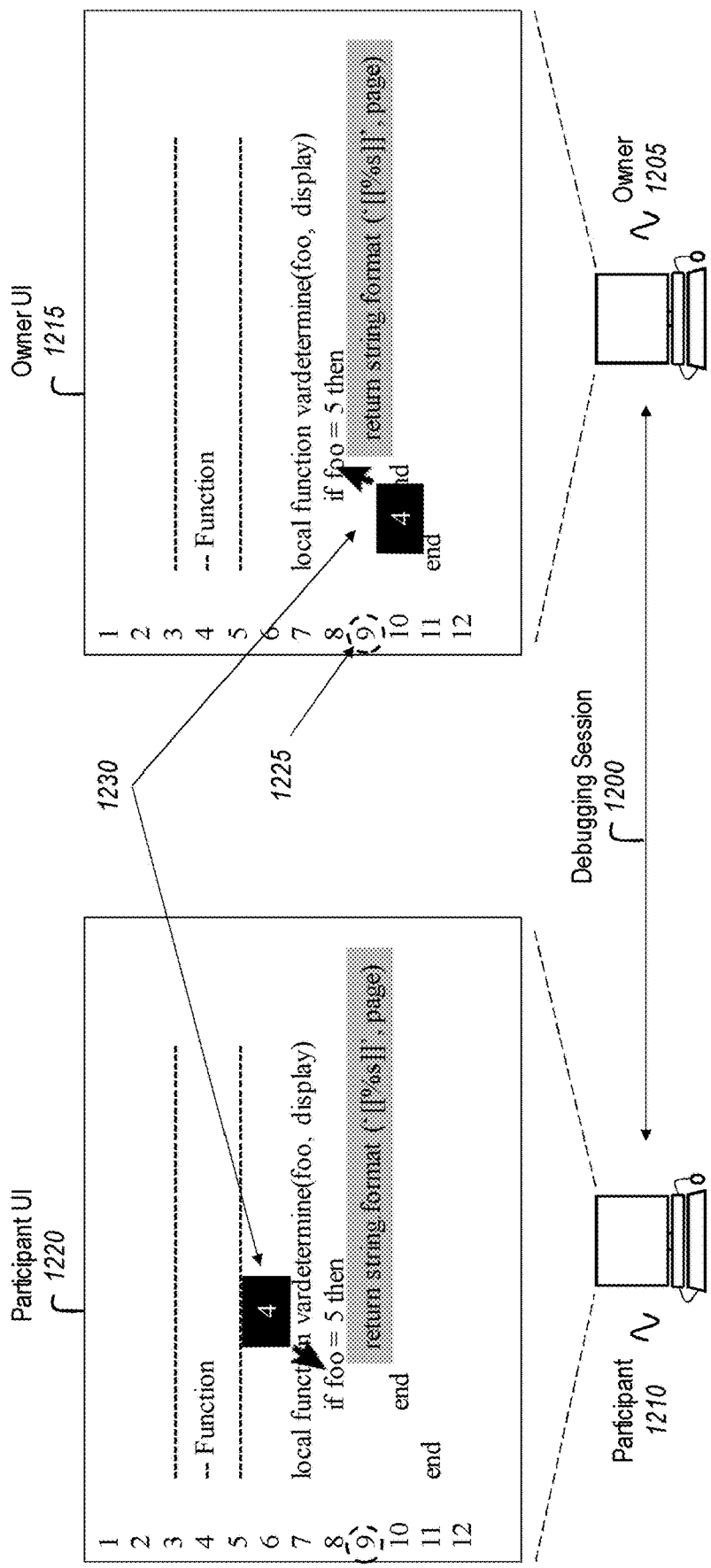
FIG. 12 illustrates how each collaborator is able to independently view debugging results.

Having just described how some of the embodiments provide debugging services, attention will now be directed to FIG. 12. In particular, this figure illustrates how each collaborator is able to independently inspect debugging results. Here, a debugging session 1200 in which an owner computer system 1205 and a participant computer system 1210 are both members has been established. Further, FIG. 12 shows that the owner computer system 1205 may include an owner UI 1215 and that the participant computer system 1210 may include a participant UI 1220.

In the scenario presented in FIG. 12, the owner UI 1215 and the participant UI 1220 are displaying the same body of compiled source code. Of note, this source code has been executed up to line 9. Stated differently, a stop event occurred at line 9. This stop event occurred because a breakpoint 1225 was place in the source code. Here, it is worthwhile to note that each collaborator is able to independently place breakpoints in the source code. Accordingly, the source code has executed up to line 9, and this execution has produced debugging results. These results are published to each of the collaborators.

To illustrate that each collaborator receives the debugging results, FIG. 12 shows two cursors that are pointing to the same variable (i.e. the variable "foo" found on line 8). One cursor is on the owner UI 1215 while the other cursor is on the participant UI 1220. As shown in FIG. 12, both the owner UI 1215 and the participant UI 1220 are displaying some debugging results 1230. In particular, the debugging results 1230 indicate the value of the variable "foo," which value is 4. Here, these debugging results 1230 are presented as a result of the cursor hovering over that variable. It should be noted that although FIG. 12 presents a scenario in which both cursors are pointing to the same variable, the embodiments are configured to enable the collaborators to independently view the values of the other variables. Accordingly, FIG. 12 is just one example scenario and should not be considered limiting. In this manner, the thread data, variable data, memory data, etc. is all preserved and made available to the collaborators.

It will be appreciated that other debugging and/or diagnostic tools are also available to each of the collaborators. For example, in some embodiments, each collaborator may be able to independently access source code watches, the call stack, and/or the variables. Additionally or alternatively, some embodiments include diagnostic tools that enable the collaborators to access a wide variety of diagnostic information. By way of example and not limitation, some embodiments enable the performance of operations that include, but are not limited to, viewing/manipulating memory, accessing in-context production data, and/or generating/accessing performance profiling features. Even further, the collaborators are able to use interactive windows that can be used to change the debugging state across all of the collaborators (e.g., Console or Immediate Windows). As discussed earlier, in some instances, the owner of the shared build instance is a machine (e.g., a machine that is operating in a "live" or "production" environment) rather than a human owner. Even when operating under such scenarios, the human participants will still be able to perform debugging and diagnostic operations (e.g., the diagnostic operations described above) in a collaborative manner.

In some circumstances, a debugging session (e.g., debugging session 1200) is tied to the process that is currently being debugged. As a result, a collaboration session (e.g., collaboration session 1000 shown in FIG. 10) can actually include multiple debugging sessions. Therefore, in some instances, there may be multiple active debugging sessions, where each debugging session can be initiated, stopped, and restarted multiple times within the same overall collaboration session.

Additionally, the disclosed embodiments enable the human owner to retrace his/her steps while using the application and to publish his/her steps to the participant computer systems so the human participants can view those steps. As an example only, the collaborators are able to use one or more step backward commands in order to view historical debugging data, as discussed earlier. By retracing the steps, the process leading up to an error can be followed and the human participants will be better informed regarding where the error lies in the source code.

Sometimes one of the collaborators may leave the debugging session and then return at a later time. When the collaborator rejoins the debugging session, some of the embodiments are configured to automatically direct the collaborator to the location of the debug cursor. In this manner, the collaborator will be able to very quickly learn where the debugging process is occurring.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These methods may be implemented by one or more processors of a computer system (e.g., the computer system 100 of FIG. 1). By way of example, a computer system includes one or more computer-readable hardware storage media that store computer-executable code. This computer-executable code is executable by the one or more processors to cause the computer system to perform these methods.

Figure 13:
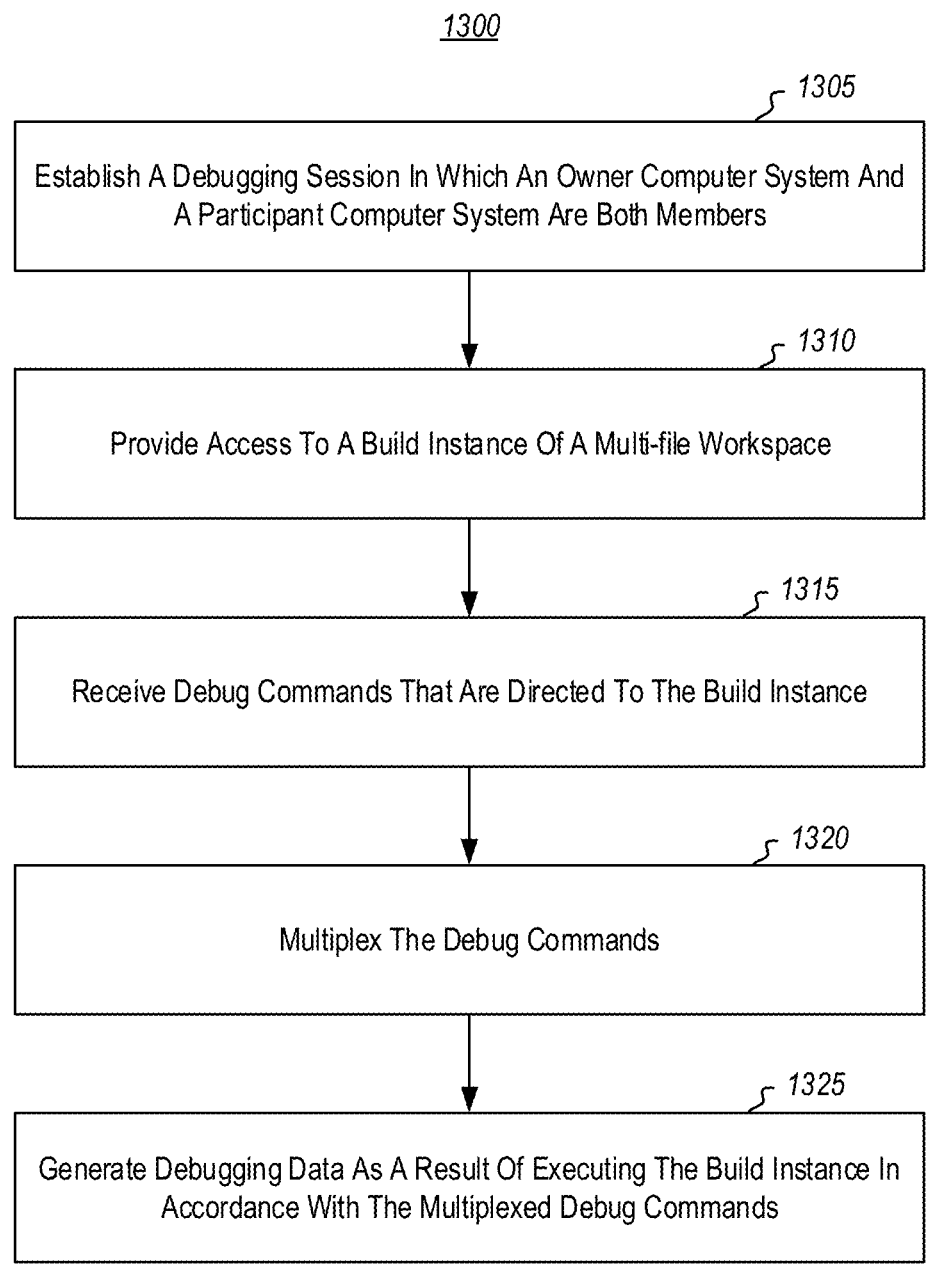
FIG. 13 provides an example method for enabling multiple collaborators to jointly debug a workspace.

FIG. 13 illustrates an example method 1300 for providing a debugging session with full multi-collaborator control. Initially, method 1300 includes an act of establishing a debugging session in which an owner computer system and a participant computer system are both members (act 1305).

Within this debugging session, both the owner computer system and the participant computer system are provided access to a build instance of a multi-file workspace (act 1310). Here, both of these acts may be performed by a collaboration agent (e.g., collaboration agent 415 shown in FIG. 4).

In some embodiments, the multi-file workspace and the build instance are both stored locally on the owner computer system. Further, the multi-file workspace may include multiple files of source code. As a result, the build instance may be a build of the source code.

Next, method 1300 includes an act of receiving various different debug commands that are directed to the build instance (act 1315). Here, this act may be performed by the multiplexor 1025 shown in FIG. 10. Notably, some of the debug commands may originate from the owner computer system while some of the other debug commands may originate from the participant computer system.

Method 1300 also includes an act of multiplexing the debug commands (act 1320). Here, this act may also be performed by the multiplexor 1025 shown in FIG. 10. As a result of multiplexing the debug commands, in some instances, no differentiation will be made between a debug command that is issued by the owner computer system and a debug command that is issued by the participant computer system.

Finally, method 1300 includes an act of generating debugging data/results as a consequence of executing the build instance in accordance with the debug commands (act 1325). Here, this act may be performed by the client application 425 shown in FIG. 4. For example, the client application 425 may be an IDE that is configured to compile, build, execute, and debug source code. As a result, executing the build instance may be performed only on the owner computer system such that the debugging data is generated only on the owner computer system.

Accordingly, the disclosed embodiments enable collaborators in a collaboration session to each issue debug commands so as to jointly debug a multi-file workspace. In this manner, the embodiments are able to provide valuable debugging data to the collaborators. This data will help the collaborators understand how the workspace operates. Further, the debugging data is independently accessible by both the owner computer system and the participant computer systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An owner computer system comprising:
one or more processors; and
one or more computer-readable hardware storage devices having stored thereon computer-executable instructions that are structured to be executable by the one or more processors to thereby cause the owner computer system to:
within a collaboration session which includes a debugging session in which the owner computer system and a participant computer system are both members, provide access to a build instance of a multi-file workspace, the access being provided to both the owner computer system and the participant computer system, wherein
the multi-file workspace and the build instance are both stored locally on the owner computer system,
the multi-file workspace includes multiple files of source code,
the build instance is an executable build of the source code, and
wherein editing of the source code, execution of the build of the source code, and debugging, by both the owner computer system and the participant computer system, all occur within the collaboration session on the owner computer;
receive in parallel a plurality of debug commands directed to the build instance, wherein some of the plurality of debug commands originate from the owner computer system and some of the plurality of debug commands originate from the participant computer system;
multiplex the plurality of debug commands, wherein multiplexing includes organizing the plurality of debug commands into a determined order and transmitting serially the ordered debug commands to an entity on the owner computer system that will be used to debug the build instance;
execute the build instance on the owner computer system;
while executing the build instance on the owner computer system, execute the plurality of debug commands against the build instance as multiplexed and in the determined order;
generate debugging data as a result of executing the plurality of debug commands against the build instance in accordance with the ordered multiplexed plurality of debug commands;
return debugging data associated with the debug commands originating from the owner computer system to a client on the owner computer system; and
return debugging data associated with the debug commands originating from the participant computer system to a client on the participant computer system.

2. The computer system of claim 1, wherein the debugging session is initiated within a collaboration session in which the owner computer system and the participant computer system are both members.

3. The computer system of claim 1, wherein multiplexing the plurality of debug commands is performed by a multiplexor residing on the owner computer system.

4. The computer system of claim 1, wherein the owner computer system initiates creating the build instance of the source code.

5. The computer system of claim 1, wherein the participant computer system initiates creating the build instance of the source code.

6. The computer system of claim 1, wherein the owner computer system initiates the debugging session.

7. The computer system of claim 1, wherein the participant computer system initiates the debugging session.

8. The computer system of claim 1, wherein providing access to the build instance includes providing an output of the build instance to both the owner computer system and the participant computer system.

9. The computer system of claim 1, wherein the debugging data is independently accessible by both the owner computer system and the participant computer system.

10. The computer system of claim 1, wherein the owner computer system and the participant computer system share control of a single debug cursor.

11. The computer system of claim 1, wherein executing the build instance in accordance with the multiplexed plurality of debug commands is performed only on the owner computer system such that the debugging data is generated only on the owner computer system, and wherein the debugging data is caused to be accessible to the participant computer system.

12. The computer system of claim 1, wherein, as a result of multiplexing the plurality of debug commands, no differentiation is made between a debug command issued by the owner computer system and a debug command issued by the participant computer system.

13. The computer system of claim 1, wherein a debug command includes at least one of a step forward command, a step backward command, a step into command, a step over command, or an execute to breakpoint command.

14. A method for establishing a multi-collaborator debugging session, the method being implemented by one or more processors of an owner computer system, the method comprising:
within a collaboration session which includes a debugging session in which the owner computer system and a participant computer system are both members, providing access to a build instance of a multi-file workspace, the access being provided to both the owner computer system and the participant computer system, wherein
the multi-file workspace and the build instance are both stored locally on the owner computer system,
the multi-file workspace includes multiple files of source code,
the build instance is an executable build of the source code, and
wherein editing of the source code, execution of the build of the source code, and debugging, by both the owner computer system and the participant computer system, all occur within the collaboration session on the owner computer;
receiving in parallel a plurality of debug commands directed to the build instance, wherein some of the plurality of debug commands originate from the owner computer system and some of the plurality of debug commands originate from the participant computer system;
multiplexing the plurality of debug commands, wherein multiplexing includes organizing the plurality of debug commands into a determined order and transmitting serially the ordered debug commands to an entity on the owner computer system that will be used to debug the build instance;
executing the build instance on the owner computer system;
while executing the build instance on the owner computer system, executing the plurality of debug commands against the build instance as multiplexed and in the determined order;
generating debugging data as a result of executing the plurality of debug commands against the build instance in accordance with the ordered multiplexed plurality of debug commands;
returning debugging data associated with the debug commands originating from the owner computer system to a client on the owner computer system; and
returning debugging data associated with the debug commands originating from the participant computer system to a client on the participant computer system.

15. The method of claim 14, wherein providing access to the build instance includes providing an output of the build instance to both the owner computer system and the participant computer system.

16. The method of claim 14, wherein the owner computer system and the participant computer system share control of a single debug cursor such that no differentiation is made between a debug command issued by the owner computer system and a debug command issued by the participant computer system.

17. The method of claim 14, wherein executing the build instance in accordance with the multiplexed plurality of debug commands is performed only on the owner computer system such that the debugging data is generated only on the owner computer system, and wherein the debugging data is caused to be accessible to the participant computer system.

18. The method of claim 14, wherein the debugging session includes three or more members, the owner computer system being a first member, the participant computer system being a second member, and a second participant computer system being a third member.

19. One or more hardware storage devices having stored thereon computer-executable instructions that are structured to be executable by one or more processors of an owner computer system to thereby cause the owner computer system to:
within a collaboration session which includes a debugging session in which the owner computer system and a participant computer system are both members, provide access to a build instance of a multi-file workspace, the access being provided to the owner computer system and the participant computer system, wherein
the multi-file workspace and the build instance are both stored locally on the owner computer system,
the multi-file workspace includes multiple files of source code,
the build instance is an executable build of the source code, and
wherein editing of the source code, execution of the build of the source code, and debugging, by both the owner computer system and the participant computer system, all occur within the collaboration session on the owner computer;
receive in parallel a plurality of debug commands directed to the build instance, wherein some of the plurality of debug commands originate from the owner computer system and some of the plurality of debug commands originate from the participant computer system;
multiplex the plurality of debug commands, wherein multiplexing includes organizing the plurality of debug commands into a determined order and transmitting serially the ordered debug commands to an entity on the owner computer system that will be used to debug the build instance;
execute the build instance on the owner computer system;
while executing the build instance on the owner computer system, execute the plurality of debug commands against the build instance as multiplexed and in the determined order;
generate debugging data as a result of executing the plurality of debug commands against the build instance in accordance with the ordered multiplexed plurality of debug commands;

return debugging data associated with the debug commands originating from the owner computer system to a client on the owner computer system; and return debugging data associated with the debug commands originating from the participant computer system to a client on the participant computer system.

20. The one or more hardware storage devices of claim 19, wherein the debugging data is independently accessible by both the owner computer system and the participant computer system.

* * * * *